US012592894B2

(12) United States Patent
   Kim

(10) Patent No.: US 12,592,894 B2
(45) Date of Patent: Mar. 31, 2026

(54) SYSTEM FOR CONTROLLING NETWORK CONNECTION BASED ON CONTROLLER, AND METHOD THEREFOR

(71) Applicant: PRIBIT Technology, Inc., Seoul (KR)

(72) Inventor: Young Rang Kim, Seoul (KR)

(73) Assignee: PRIBIT TECHNOLOGY, INC, Seoul (KR)

( * ) Notice: Subject to any disclaimer, the term of this patent is extended or adjusted under 35 U.S.C. 154(b) by 0 days.

(21) Appl. No.: 18/703,293

(22) PCT Filed: Sep. 8, 2022

(86) PCT No.: PCT/KR2022/013584
§ 371 (c)(1),
(2) Date: Apr. 19, 2024

(87) PCT Pub. No.: WO2023/068553
PCT Pub. Date: Apr. 27, 2023

(65) Prior Publication Data
US 2025/0240249 A1     Jul. 24, 2025

(30) Foreign Application Priority Data
Oct. 20, 2021     (KR) ........................ 10-2021-0139944

(51) Int. Cl.
*H04L 29/06* (2006.01)
*H04L 9/40* (2022.01)
*H04L 47/2483* (2022.01)

(52) U.S. Cl.
CPC ............ *H04L 47/2483* (2013.01); *H04L 9/40* (2022.05)

(58) Field of Classification Search
CPC ....... H04L 47/2483; H04L 9/40; H04L 29/06; H04L 63/101; H04L 63/0236; G06F 15/16

(Continued)

(56) References Cited

U.S. PATENT DOCUMENTS 8,953,434 B1 * 2/2015 Tirupachur Comerica ................. H04L 41/0895 370/216
10,602,364 B2 * 3/2020 Diem ...................... H04W 4/20
(Continued)

FOREIGN PATENT DOCUMENTS

JP     2017-175462 A     9/2017
KR     10-1712168 B1     3/2017
(Continued)

*Primary Examiner* — Jude Jean Gilles

(74) *Attorney, Agent, or Firm* — Seed Intellectual Property Law Group LLP

(57)     ABSTRACT

A node according to an embodiment disclosed in the present document may comprise a communication circuit, a processor operatively connected to the communication circuit, and a memory which is operatively connected to the processor and stores a reception application and an access control application, wherein the memory stores instructions causing, when executed by the processor, the node to: detect a network reception event from a source network through the access control application; through the access control application, identify the presence or absence of a data flow which is applied from an external server and corresponds to a destination service port included in a data packet from the source network; and through the access control application, request network reception from the external server on the basis of the presence or absence of the applied data flow and whether the applied data flow includes identification information of the source network.

10 Claims, 20 Drawing Sheets

(58) Field of Classification Search
USPC ........................................................ 709/224
See application file for complete search history.

(56) References Cited

U.S. PATENT DOCUMENTS

| | | | |
|---|---|---|---|
| 10,659,462 B1* | 5/2020 | Kim .................... | H04L 63/0876 |
| 2008/0034415 A1* | 2/2008 | Chacko .............. | G06F 21/6218 |
| | | | 726/14 |
| 2008/0034419 A1* | 2/2008 | Mullick ............... | H04L 63/102 |
| | | | 726/15 |
| 2017/0126549 A1* | 5/2017 | Paramasivam ....... | H04L 47/624 |
| 2021/0091976 A1 | 3/2021 | Kim et al. | |
| 2021/0092094 A1 | 3/2021 | Kim et al. | |
| 2021/0092095 A1 | 3/2021 | Kim et al. | |
| 2021/0328830 A1 | 10/2021 | Kim et al. | |
| 2022/0247718 A1 | 8/2022 | Kim et al. | |
| 2022/0247719 A1 | 8/2022 | Kim et al. | |
| 2022/0247720 A1 | 8/2022 | Kim | |
| 2022/0247721 A1 | 8/2022 | Kim | |
| 2022/0247748 A1 | 8/2022 | Kim | |
| 2022/0255906 A1 | 8/2022 | Kim et al. | |
| 2022/0337604 A1 | 10/2022 | Kim et al. | |

FOREIGN PATENT DOCUMENTS

| | | | |
|---|---|---|---|
| KR | 10-2018-0019273 A | 2/2018 | |
| KR | 10-2021-0045917 A | 4/2021 | |
| KR | 10-2309115 B1 | 10/2021 | |
| KR | 10-2407135 B1 | 6/2022 | |

* cited by examiner

SENSE NETWORK
RECEPTION EVENT —1605

DATA FLOW AUTHORIZED
IS PRESENT? 1610

N

Y

DATA FLOW
AUTHORIZED
INCLUDES IDENTIFICATION
INFORMATION OF
STARTING
NETWORK? 1615

Y

N

REQUEST FOR NETWORK
RECEPTION 1620

RECEIVE DATA PACKET 1635

RECEIVE UPDATED DATA FLOW —1625

RECEIVE DATA PACKET,
BASED ON UPDATED DATA FLOW —1630

DROP DATA PACKET 1640

SYSTEM FOR CONTROLLING NETWORK CONNECTION BASED ON CONTROLLER, AND METHOD THEREFOR

CROSS-REFERENCE TO RELATED APPLICATIONS

This application claims the benefit of priority to Korean Patent Application No. 10-2021-0139944, filed in the Korean Intellectual Property Office on Oct. 20, 2021, the entire contents of which are incorporated herein by reference.

BACKGROUND

Technical Field

The present disclosure relates to a system for controlling controller-based network access and method for the same.

Description of the Related Art

A plurality of devices may make data communication through a network. For example, a smartphone may transmit or receive data to or from a server through the Internet. The network may include a private network, such as an intranet, as well as a public network such as the Internet.

BRIEF SUMMARY

Technical Problem

To control indiscriminate connection to the network, a technology which restricts connection to a network, based on a transmission control protocol)/Internet protocol (TCP/IP) has been applied.

For example, a network access controller (NAC) allows an authorized terminal to access a network by receiving an authorized IP address. When an unauthorized terminal uses an unauthorized IP address, the NAC blocks the unauthorized terminal using address resolution protocol spoofing (ARP). A firewall is a scheme of determining whether to allow the transmission of data packets, based on the IP of a starting point, the IP of a destination point, port information, and policy included in IP header information. Virtual private network (VPN) is a scheme of ensuring the integrity and confidentiality of data packets by using a tunnel to which encryption is applied on the TCP/IP protocol.

However, ARP spoofing applies a load on the network. Accordingly, recently, a technology to bypass it has been developed. The firewall is used for controlling the flow of the data packets. Accordingly, the firewall may not be directly involved in the process of making a connection between two nodes. In addition, the VPN are vulnerable to the management of data packet flows after tunnels are created. In addition, since the above technologies are based on the TCP/IP, the above technologies may be vulnerable to security in other layers (e.g., an application layer) of an open system interconnection (OSI) layer.

Various embodiments disclosed in the present disclosure are intended to provide a system for solving the above-described problems in a network environment and a method for the same.

Technical Solution

According to an embodiment disclosed of the present disclosure, a node may include a communication circuit, a processor operatively connected to the communication circuit, and a memory operatively connected to the processor to store a receive application and an access control application. The memory may store instructions causing the node to, when executed by the processor, sense a network reception event from a starting network through the access control application, identify presence of a data flow corresponding to a destination service port included in a data packet received from the starting network through the access control application and authorized by an external server, and transmit, to the external server, a request for network reception, based on whether the authorized data flow is present and whether the authorized data flow includes identification information of the starting network, through the access control application.

According to an embodiment disclosed of the present disclosure, a node may include a communication circuit, a processor operatively connected to the communication circuit, and a memory operatively connected to the processor to store a receive application and an access control application. The memory may store instructions causing the node to, when executed by the processor, sense a network transmission event for a response to a data packet received through the access control application, identify, through the access control application, presence of a data flow corresponding to a starting service port included in a response data packet to the data packet received and the receive application and, authorized by an external server, and transmit, to the external server, a request for network transmission, through the access control application, based on whether the authorized data flow is present and on whether the authorized data flow includes identification information of a destination network.

According to an embodiment disclosed of the present disclosure, a server may include a communication circuit, a memory to store a database, and a processor operatively connected to the communication circuit and the memory. The processor may receive a first request for requesting controller access to the server, from an access control application of a node, the first request including at least one of identification information of the node, identification information of the access control application, and identification information of a network to which the node belongs, determine whether the node allows access, based the identification information included in the first request, and the database, generate a control flow when the node is a device allowing access, generate information about an application allowing reception or information about a service port allowing reception, based on the identification information, and transmit, to the node, identification information of the control flow, the information about the application allowing the reception, or the information about the service port allowing the reception through the communication circuit.

According to an embodiment disclosed of the present disclosure, an operating method of an access control application stored in a node, may include sensing an event for network reception from a starting network, identifying presence of a data flow corresponding to a service port included in a data packet received from the starting network through the access control application and authorized by an external server, dropping the data packet when the authorized data flow is absent, and receiving the data packet, when the authorized data flow is present and includes identification information of the starting network, transmitting, to the external server, a request for the network reception, when the authorized data flow is present, but fails to include the identification information of the starting network, the request for the network reception including the identification information of the starting network, identification information about the service port or identification information of the authorized data flow, receiving a data flow updated, from the external server, the updated data flow including the identification information of the starting network, and receiving the data packet, based on the updated data flow.

Advantageous Effects

According to embodiments of the present disclosure, the node may block the reception of the data packet from the application unauthorized.

In addition, according to embodiments of the present disclosure, as compared to the network security technology, such as NAC, based on a broad range of IP addresses, the issues on policy establishment and policy withdrawal may be more resolved, and roundabout attacks may be more blocked.

In addition, according to embodiments of the present disclosure, a man in the middle attack (MITM) scheme may be blocked under a zero-trust network environment. Accordingly, the access control may be performed based on the tunnel, as compared to a VPN protecting only a specific section.

In addition, according to embodiments of the present disclosure, the inherent problem of the TCP/IP-based network security technology may be resolved and the safe network access may be provided.

Further, according to embodiments of the present disclosure, the issue on the policy establishment depending on the network control equipment may be resolved.

In addition, according to embodiments of the present disclosure, the Long round trip may be prevented by identifying the reception state of the destination node and the reception state of the receive application in advance.

Further, according to embodiments of the present disclosure, the application, which waits for network reception based on the application execution event or the application termination event at the destination node, is constantly tracked, thereby constantly receiving the reception state of the application.

In addition, according to embodiments of the present disclosure, the controller has information about the application in the reception state at the destination node. Accordingly, the data packet may be transmitted to the destination node more rapidly.

In addition, according to embodiments of the present disclosure, the destination node may control the network access when receiving the data packet and when making a reception response to the received data packet.

In addition, according to embodiments of the present disclosure, the destination node may control the network access based on the service port, when the destination node fails not know the identification information of the receive application.

Besides, a variety of effects directly or indirectly understood through the present disclosure may be provided.

DETAILED DESCRIPTION

Figure 1:
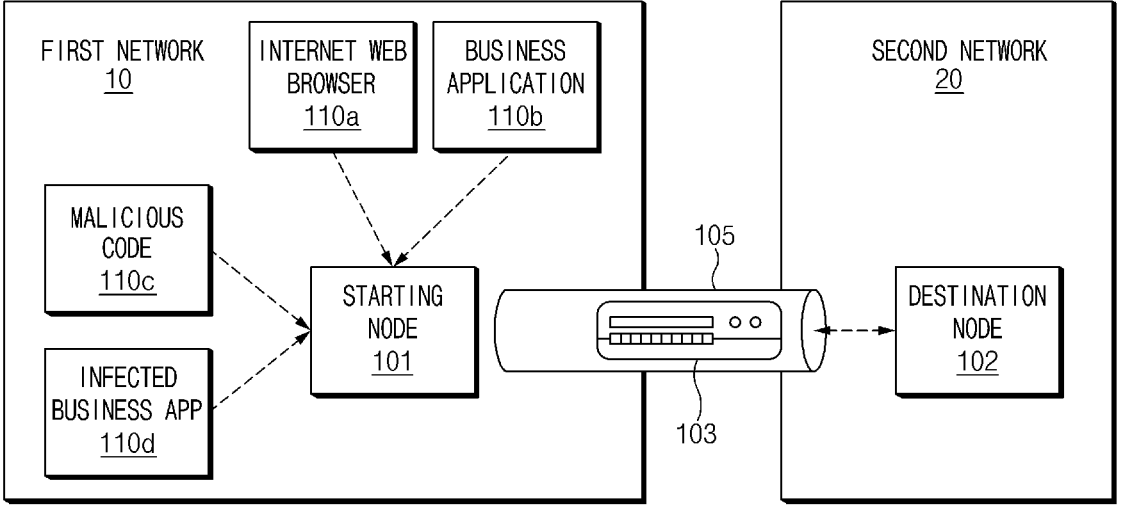
FIG. 1 illustrates an environment including a plurality of networks.

Hereinafter, various embodiments of the present disclosure will be described with reference to accompanying drawings. However, those of ordinary skill in the art will understand that the present disclosure is not limited to a specific embodiment, and modifications, equivalents, and/or alternatives on the various embodiments described herein can be variously made without departing from the scope and spirit of the present disclosure.

In the present disclosure, singular forms of noun corresponding to an item may include one or more items unless the context clearly indicates otherwise. In the present disclosure disclosed herein, each of the wordings "A or B," "at least one of A and B," "at least one of A or B," "A, B, or C," "at least one of A, B, and C," or "at least one of A, B, or C," and the like used herein may include any one and all combinations of items arranged together in a relevant wording of the wordings. The expressions, such as "a first," "a second," "the first," or "the second," may be used merely for the purpose of distinguishing a component from another component, but do not limit the corresponding component in other aspect (e.g., the importance or the order). It is to be understood that if a component (e.g., a first component) is referred to, with or without the term "operatively" or "communicatively," as "coupled with," "coupled to," "connected with," or "connected to" the another component (e.g., a second component), it means that the component may be coupled with the another component directly (e.g., wiredly), wirelessly, or via a third component.

Each component (e.g., the module or the program) of the above-described components described in the present disclosure may include one or plural entities. According to various embodiments, at least one or more components of the components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The term "module" used in the present disclosure may include a unit implemented in hardware, software, or firmware and may be, for example, interchangeably used with the terms "logic," "logical block," "part" and "circuit." The "module" may be a minimum unit of an integrated part or may be a part thereof. For example, according to an embodiment, the "module" may be implemented in the form of an application-specific integrated circuit (ASIC).

Various embodiments of the present disclosure may be implemented by software (e.g., the program or application) including an instruction stored in a storage medium (e.g., a memory) readable by a machine. For example, the processor of the device may call at least one instruction of one or more instructions from the storage medium and may execute the at least one instruction. This allows the machine to run to perform at least one function according to the at least one instruction, which is called. The one or more instructions may include a code generated by a compiler or a code executable by an interpreter. The machine-readable storage medium may be provided in the form of non-transitory storage medium. Here, the term "non-transitory," as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

The method according to various embodiments disclosed in the present disclosure may be provided as a part of a computer program product. The computer program product may be traded as goods between a seller and a buyer. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

FIG. 1 illustrates an environment including a plurality of networks.

Referring to FIG. 1, a first network 10 and a second network 20 may be different networks. For example, the first network 10 may be a public network, such as the Internet, and the second network 20 may be a private network such as an intranet or a VPN.

The first network 10 may include a starting node 101. According to embodiments to be described below, in FIG. 1, the 'starting node' may be various types of devices to make data communication. For example, the starting node 101 may include a portable device, such as a smartphone or a tablet, a computer device, such as a desktop or laptop, a multimedia device, a medical device, a camera, a wearable device, a virtual reality (VR) device, or a home appliance, but the present disclosure is not limited thereto. For example, the starting node 101 may include a server or a gateway to transmit a data packet through an application. The starting node 101 may also be referred to as an 'electronic device' or a 'terminal.' Meanwhile, a destination node 102 may include a device similar to the starting node 101 described above.

The starting node 101 may attempt to access the second network 20 and transmit data to the destination node 102 which is included in the second network 20. The starting node 101 may transmit data to the destination node 102 through a gateway 103 and a tunnel 105.

When the access of the starting node 101 to the first network 10 is approved, the starting node 101 may communicate with all servers included in the first network 10. Accordingly, the starting node 101 may be exposed from attacks of malicious programs. For example, the starting node 101 may receive data from trusted and/or secured applications, such as an Internet web browser 110a and a business application 110b, as well as data from untrusted or unsecured applications such as a business application 110d infected with malicious codes 110c.

The starting node 101 infected from the malicious program may attempt to access and/or transmit data to the second network 20. When the second network 20 is formed based on an IP, such as a VPN, it may be difficult for the second network 20 to individually monitor a plurality of devices, which are included in the second network 20, and the second network 20 may be vulnerable to security for an application layer or a transfer layer in an OSI layer. In addition, when the starting node 101 includes a malicious application after the tunnel is already created, data of the malicious application may be transmitted to another electronic device (e.g., the destination node 102) in the second network 20.

Figure 2:
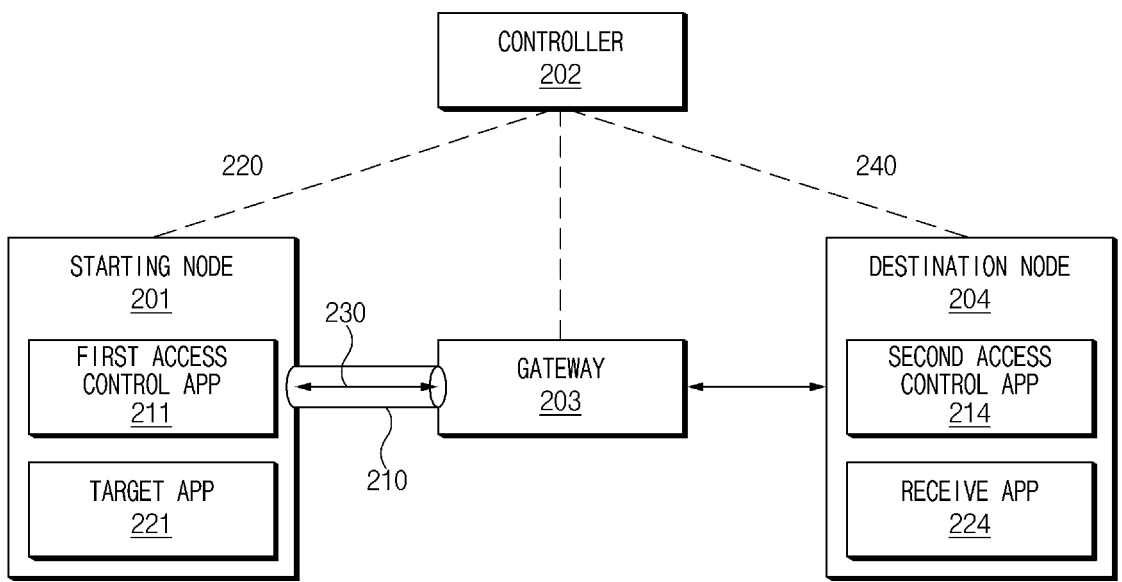
FIG. 2 illustrates an architecture in a network environment, according to various embodiments.

FIG. 2 illustrates an architecture in a network environment according to various embodiments.

Referring to FIG. 2, the number of the starting node 201, a gateway 203, and a destination node 204 is not limited to the number illustrated in FIG. 2. For example, the starting node 201 may transmit data to a plurality of destination nodes through a plurality of gateways, and the controller 202 may manage a plurality of starting nodes, gateways, and destination nodes. The starting node 201 may perform the same function as the starting node 101 illustrated in FIG. 1, the gateway 203 may perform the same function as the gateway 103 illustrated in FIG. 1, and the destination node 204 may perform the same function as the destination node 102 illustrated in FIG. 1.

The controller 202 may be, for example, a server (or a cloud server). The controller 202 may manage data transmission between the starting node 201, the gateway 203, and the destination node 204 to ensure reliable data transmission under a network environment. For example, the controller 202 may manage connection of the starting node 201 to the destination node 204 based on policy information or blacklist information, mediate the generation of a tunnel 210 authorized between the starting node 201 and the gateway 203, or remove the tunnel 210 in response to a security event collected from the starting node 201 or the gateway 203. The starting node 201 may communicate with the destination node 204 only through the tunnel 210 authorized by the controller 202. When the tunnel 210 authorized is absent, the connection of the starting node 201 to the destination node 204 may be blocked. According to an embodiment, the controller 202 may transmit and receive control data packets to and from the starting node 201 to perform various operations (e.g., registration, approval, authentication, update, and termination) associated with network access of the starting node 201. In addition, the controller 202 may transmit and receive control data packets to and from the destination node 204 to perform various operations (e.g., registration, approval, authentication, update, and termination) associated with network access and network reception of the destination node 204. The flow (e.g., see reference numerals 220 and 240), through which a control data packet is transmitted, may be referred to as a control flow.

The gateway 203 may be positioned at a boundary of a network to which the starting node 201 belongs or a boundary of a network to which the destination node 204 belongs. A plurality of gateways 203 may be provided. The gateway 203 may forward, to the destination node 204, only a data packet, which is received through the tunnel 210 authorized, among the data packets received from the starting node 201. A flow (e.g., 230) in which the data packet is transmitted between the starting node 201 and the gateway 203, between the gateway 203 and the destination node 204 or between the starting node 201 and the destination node 204 may be referred to as a data flow. The data flow may be generated in a more detailed unit (e.g., an application) as compared to the tunnel 210 generated in units of terminals or IP. According to an embodiment, the gateway 203 may be connected to the controller 202 based on a cloud. The gateway 203 may generate the tunnel 210 authorized, together with the starting node 201 under the control of the controller 202.

According to various embodiments, the starting node 201 may include a first access control application 211 and a network driver (not illustrated) for managing network access of an application stored in the starting node 201. For example, upon an access event of a target application 221 (e.g., any one of 110a to 110d), which is included in the starting node 201, to the destination node 204, the first access control application 211 may determine whether the access of the target application 221 may be allowed. When the access of the target application 221 is allowed, the first access control application 211 may transmit a data packet to the gateway 203 through the tunnel 210. The first access control application 211 may control the transmission of the data packet through a kernel including an operating system and the network driver in the starting node 201.

According to various embodiments, the destination node 204 may include the second access control application 214 and a network driver (not illustrated) for managing access of an application, which is stored in the destination node 204, to the network. For example, when a reception event for the receive application 224, which is included in the destination node 204, occurs from the starting node 201, the second access control application 214 may determine whether reception of the receive application 224 is allowed. When the reception of the receive application 224 is allowed, the second access control application 214 may receive a data packet from the starting node 201 or the gateway 203. The second access control application 214 may control the reception of the data packet through a kernel including an operating system and the network driver in the destination node 204.

Figure 3:
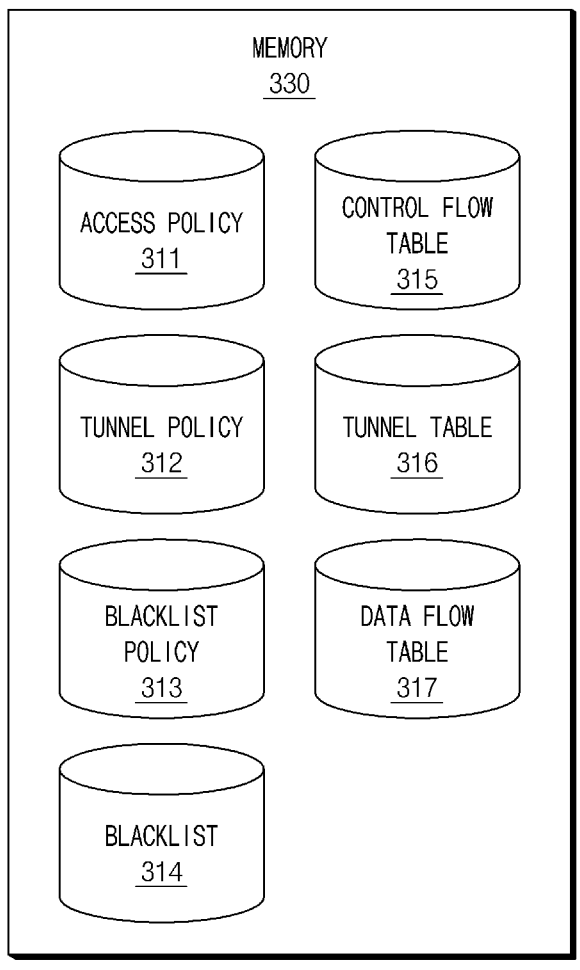
FIG. 3 is a functional block diagram illustrating databases stored in a controller, according to various embodiments.

FIG. 3 is a functional block diagram illustrating a database stored in a controller (e.g., the controller 202 of FIG. 2) according to various embodiments. Although FIG. 3 illustrates only a memory 330, the controller may further include a communication circuit (e.g., the communication circuit 430 of FIG. 4) to communicate with the external electronic device (e.g., the starting node 201, the gateway 203, or the destination node 204 of FIG. 2), and a processor (e.g., the processor 410 of FIG. 4) to control the overall operation of the controller.

Referring to FIG. 3, the controller may store databases 311 to 317 to control network access and data transmission, in the memory 330.

The access policy database 311 may include information on an identified network, a starting node, a destination node, a user, or information for a network and/or service allowing the access of the application. For example, when a request for the access of the starting node to the destination node is transmitted, the controller may determine whether the identified network (e.g., the network to which the starting node belongs), the starting node, the user (e.g., the user of the starting node), and/or the application (e.g., an application included in the starting node) may access the destination node, based on the access policy database 311.

The tunnel policy database 312 may include information about the type of a tunnel, an encryption scheme of the tunnel, and an encryption level of the tunnel to be connected to a gateway present at the boundary between the starting node (e.g., a terminal) and the network on a connection path. For example, when the request for the access of the starting node to the destination node is transmitted, the controller may provide an optimal tunnel for access to the destination node and information about the optimal tunnel to the starting node, based on the tunnel policy database 312.

The blacklist policy database 313 may include a policy for permanently or temporarily blocking access to a specific node (e.g., a starting node or a destination node). The blacklist policy database 313 may be generated, based on information (e.g., at least one of a starting node identifier (ID), an IP address, a media access control (MAC) address, or a user ID) identified through a risk, occurrence period, and/or behavior analysis of a security event, among security events periodically collected from the starting node, the destination node, or the gateway.

The blacklist database 314 may include a list of at least one of a starting node, a destination node, an IP address, a MAC address, or a user blocked through the blacklist policy database 313. For example, when identification information of a starting node transmitting the request for access to the destination node is included in the blacklist database 314, the controller may isolate the starting node from the destination node by denying the access request of the starting node.

The control flow table 315 is an example of a session table for managing a flow (e.g., a control flow) of a control data packet generated between a node (e.g., the starting node or the destination node) and the controller. When the access to the controller is successful, the information about the control flow may be generated by the controller. The information about the control flow may include at least one of identification information of the control flow, an IP address of the controller identified in the access to the controller and authentication, a node ID, or a user ID. For example, when the request for the access to the destination node is transmitted from the starting node, the controller searches for the information about the control flow based on the identification information of the control flow, which is received from the starting node, and maps at least one of an IP address, a starting node ID, or a user ID included in the searched information about the control flow to the access policy database 311, thereby determining whether the access of the starting node is allowed and whether a tunnel is created.

According to an embodiment, the control flow may have an expiration time. The node (e.g., the starting node or the destination node) needs to update the expiration time of the control flow. When the expiration time is not updated during a specific period of time, the control flow (or control flow information) may be removed. In addition, when it is determined that connection blocking is immediately necessary based on a security event collected from the node or the gateway, the controller may remove the control flow in response to the disconnection request of the node. When the control flow is removed, the previously generated tunnel and data flow may be also released, such that the connection of the node may be blocked.

The tunnel table 316 is a table for managing the tunnel connected between the starting node and the gateway. For example, the tunnel may be created in units of device or IP. When the tunnel is created between the starting node and the gateway, the tunnel table 316 may include identification information of the tunnel, identification information of a control flow when the tunnel is dependent on the control flow, a tunnel end point (TEP), a tunnel start point (TSP), a tunnel algorithm, a tunnel type, and/or additional information for managing the tunnel.

The data flow table 317 is a table for a transmission flow (e.g., the data flow) of a sub-data packet between the starting node and the destination node. The data flow may be generated in a unit of a TCP session, or an application of the starting node, or a more detailed unit within the tunnel generated in unit of starting node or IP. The data flow table 317 may include identification information of the data flow, identification information of a control flow when the data flow is dependent on the control flow, an application ID for determining whether the data packet transmitted from the starting node is authorized, an IP address of the destination node, and/or a service port. In addition, the data flow table 317 may include identification information of a tunnel to use the data flow. In addition, the data flow table 317 may include a header (or header information) for determining whether a data packet is valid. In addition, the data flow table 317 may further include whether a data flow header, which is authentication information, is inserted into the data packet, a scheme for inserting the header, whether authentication of the data flow is required, an authentication state, and/or an authentication expiration time. In addition, the data flow table 317 may include starting node information (e.g., starting IP) of the destination node, service port information, and receivable application information. In addition, the data flow table 317 may include information on a service port being received by an application to receive a data packet.

Figure 4:
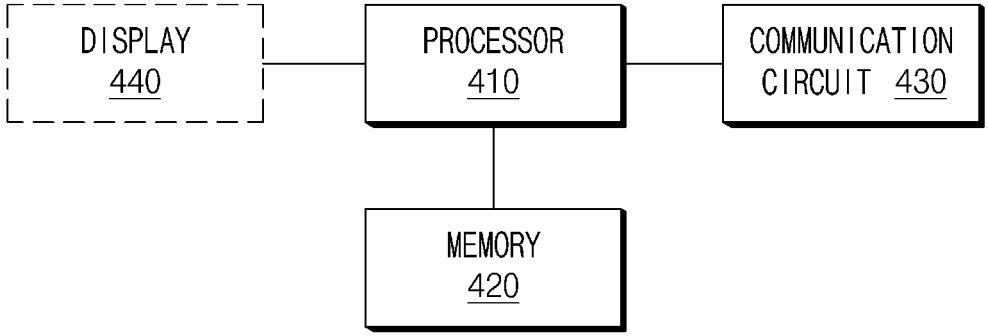
FIG. 4 illustrates a functional block diagram of a node, according to various embodiments.

FIG. 4 is a functional block diagram of a node (e.g., the starting node 201 and the destination node 204 of FIG. 2) according to various embodiments.

Referring to FIG. 4, a node may include a processor 410, a memory 420, and a communication circuit 430. According to an embodiment, the node may further include a display 440 to interface with a user.

The processor 410 may control the overall operation of the node. According to various embodiments, the processor 410 may include a single processor core or a plurality of processor cores. For example, the processor 410 may include a multi-core such as a dual-core, a quad-core, and a hexa-core. According to embodiments, the processor 410 may further include an internal or external cache memory. According to embodiments, the processor 410 may be configured with at least one processor. For example, the processor 410 may include at least one of an application processor, a communication processor, or a graphical processing unit (GPU).

The entire portion or the portion of the processor 410 may be electrically or operatively coupled with or connected to other components (e.g., the memory 420, the communication circuit 430, or the display 440) in the node. The processor 410 may receive instructions from other components in the node, interpret the received instructions, and may perform a computation or process data depending on the interpreted instructions. The processor 410 may interpret and process a message, data, an instruction, or a signal received from the memory 420, the communication circuit 430, or the display 440. The processor 410 may generate a new message, data, instruction, or signal, based on the received message, data, or instruction. The processor 410 may provide the processed or generated message, data, instruction, or signal to the memory 420, the communication circuit 430, or the display 440.

The processor 410 may process data or a signal formed or generated in or from a program. For example, the processor 410 may transmit a request for an instruction, data, or a signal to the memory 420 to execute or control the program. The processor 410 may allow the memory 420 to write (or store) or update the instruction, data, or signal to the memory 420 to execute or control the program.

The memory 420 may store an instruction for controlling a node, a control instruction code, control data, or user data. For example, the memory 420 may include at least one of an application program, an operating system (OS), middleware, or a device driver.

The memory 420 may include at least one of a volatile memory and a non-volatile memory. The volatile memory may include a dynamic random access memory (DRAM), a static RAM (SRAM), a synchronous DRAM (SDRAM), a phase-change RAM (PRAM), a magnetic RAM MRAM, a resistive RAM (RRAM), or a ferroelectric RAM (FeRAM). The non-volatile memory may include a read only memory (ROM), a programmable ROM (PROM), an electrically programmable ROM (EPROM), an electrically erasable programmable ROM (EEPROM), or a flash memory.

The memory 420 may further include a nonvolatile medium, such as a hard disk drive (HDD), a solid state disk (SSD), an embedded multi-media card (eMMC), or a universal flash storage UFS.

According to an embodiment, the memory 420 may store some of the information included in the memory (e.g., the memory 330 of FIG. 3) of the controller. For example, the memory 420 may store the tunnel table 316 and the data flow table 317 described with reference to FIG. 3.

The communication circuit 430 may support establishing a wired or wireless communication connection between a node and an external electronic device (e.g., the controller 202 or the gateway 203 of FIG. 2), and making communication through the established connection. According to an embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit, or a power line communication circuit), and may communicate with an external electronic device through a short-range communication network, such as WiFi direct or infrared data association (IrDA), or a remote communication network, such as a cellular network, the Internet, or a computer network through the relevant communication circuit. The above-described various types of communication circuits 430 may be implemented in the form of an integral-type chip or individual chips.

The display 440 may output content, data, or a signal. According to various embodiments, the display 440 may display image data processed by processor 410. According to the embodiments, the display 440 may be coupled with a plurality of touch sensors (not illustrated) to receive a touch input and configured with an integral-type touch screen. When the display 440 is configured with a touch screen, the plurality of touch sensors may be disposed on the display 440 or under the display 440.

Meanwhile, a server (e.g., a controller) according to an embodiment may include a processor 410, a memory 420, and a communication circuit 430. The processor 410, the memory 420, and the communication circuit 430 included in the server may be substantially the same as the processor 410, the memory 420, and the communication circuit 430 described above.

Figure 5:
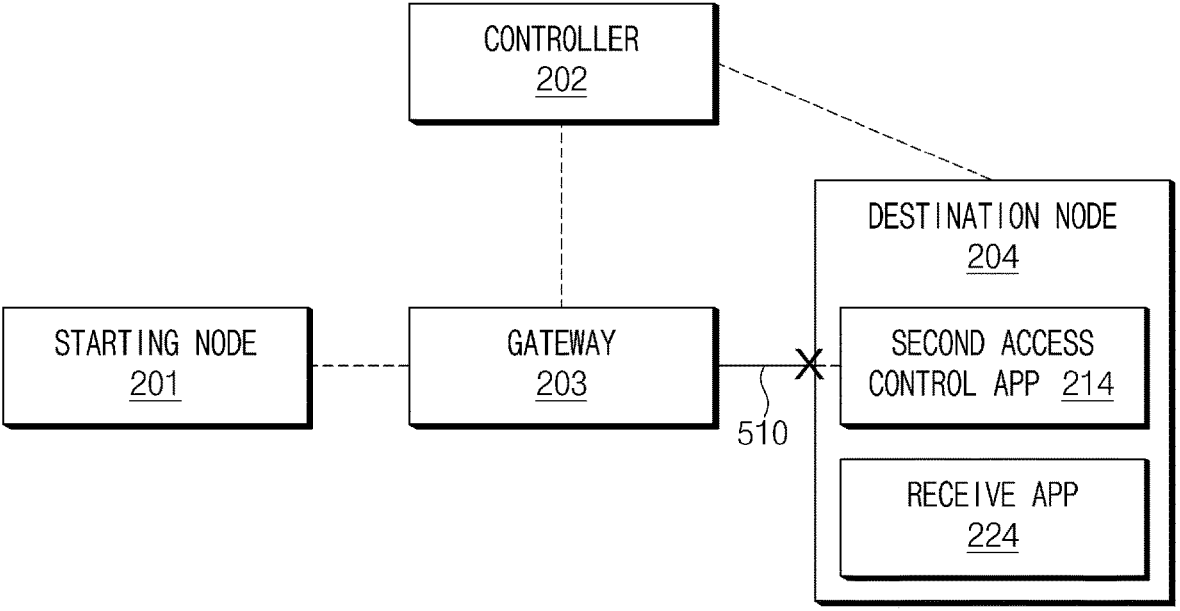
FIG. 5 illustrates an operation for controlling the reception of a data packet, according to various embodiments.

FIG. 5 illustrates an operation for controlling reception of a data packet according to various embodiments.

Referring to FIG. 5, the second access control application 214 may sense a request for network reception of a receive application 224 from a starting network including the starting node 201, and determine whether the destination node 204 or the receive application 224 is connected to the controller 202. When the destination node 204 or the receive application 224 is not connected to the controller 202, the second access control application 214 may block a kernel, which includes an operating system, or a network driver from receiving the data packet (operation 510).

In addition, the second access control application 214 may sense a request for network transmission for transmitting a data packet in response to the data packet received from the starting node 201, and may determine whether the receive application 224 transmitting the data packet for response is connected to the controller 202. When the receive application 224 transmitting the data packet for response is not connected to the controller 202, the second access control application 214 may block the transmission of the data packet. Accordingly, the destination node 204 may control the access of the starting node 201 by not transmitting the response to the data packet received from the starting node 201 (operation 510).

Figure 6:
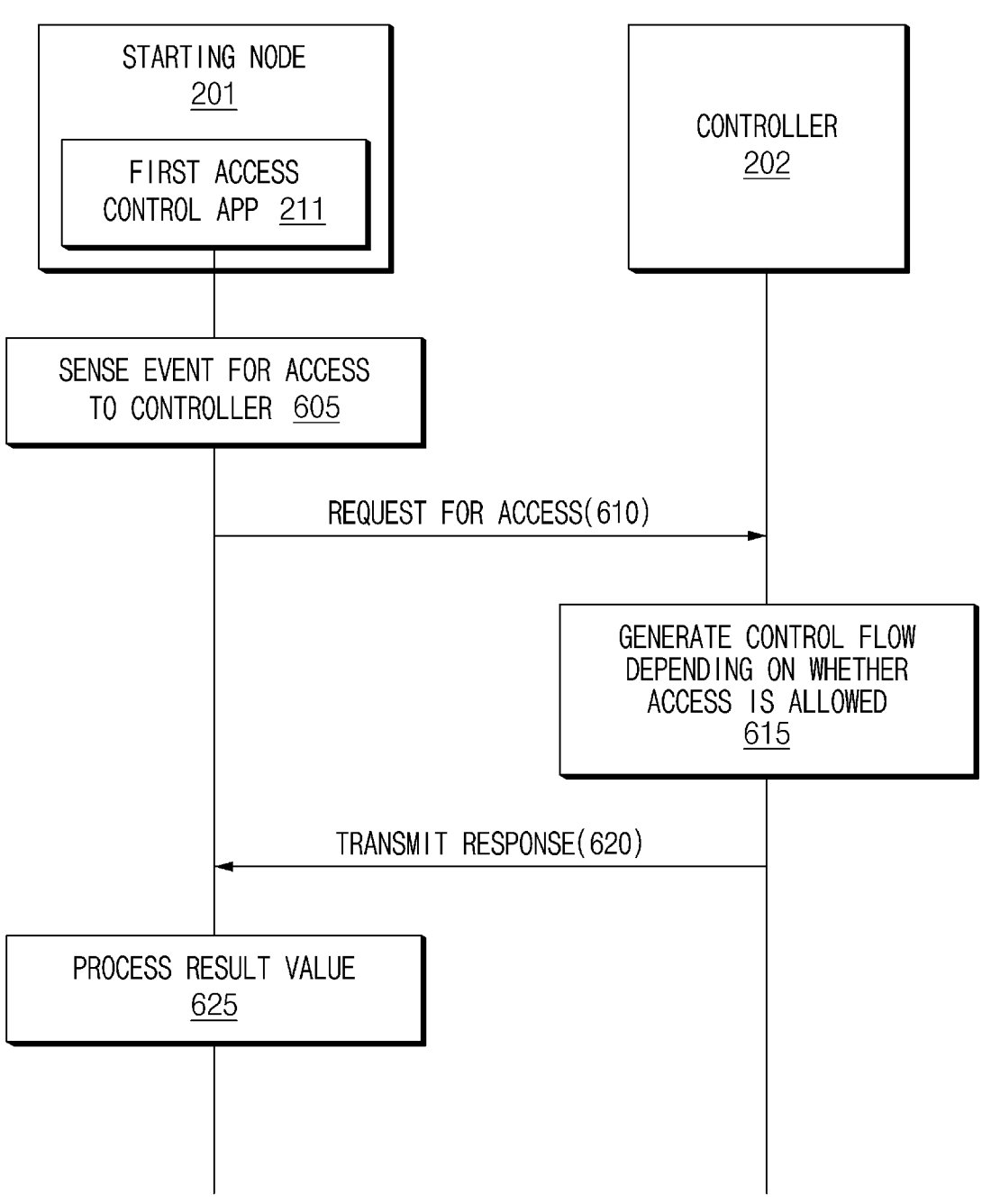
FIG. 6 is a signal flowchart for the access of a starting node to a controller, according to various embodiments.
Figure 7:
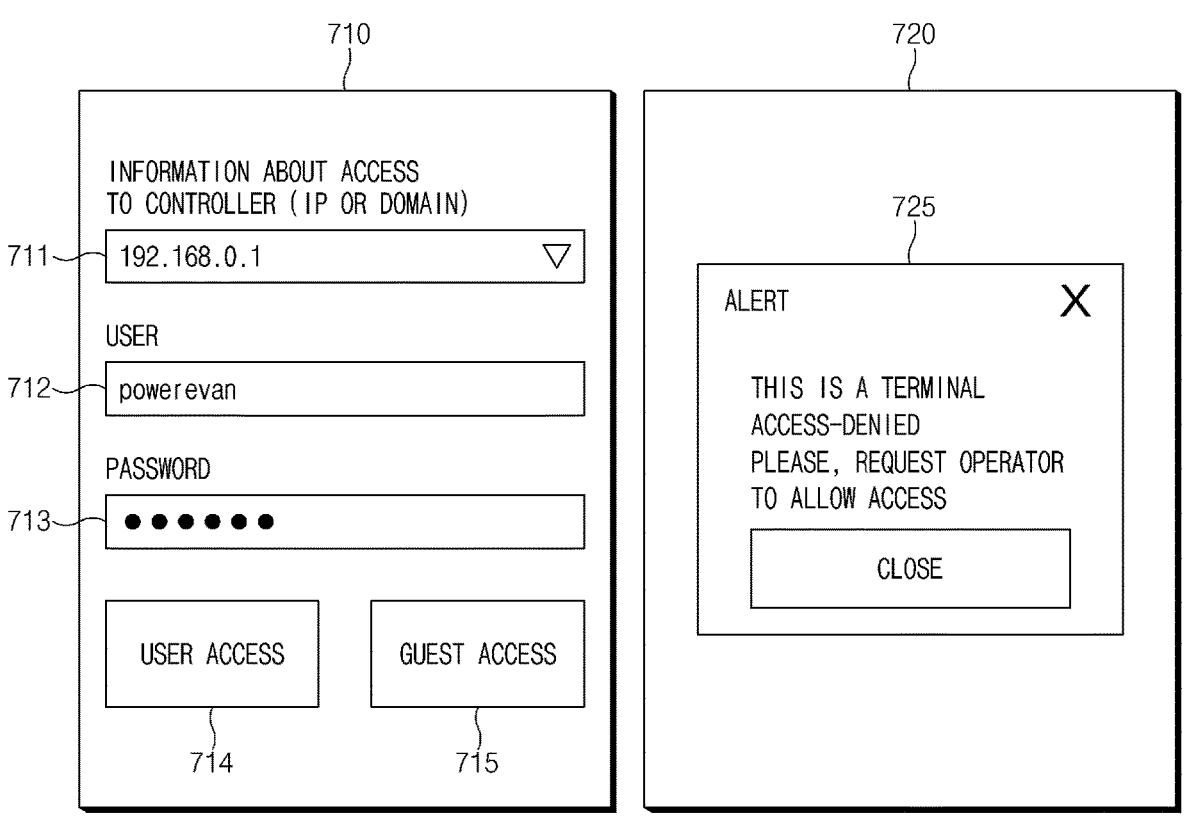
FIG. 7 illustrates a user interface screen for the access of a starting node to a controller by a starting node, according to various embodiments.

FIGS. 6 to 7 illustrate operations for the access of the starting node to a controller according to various embodiments. FIG. 6 illustrates a signal flowchart for the access of the starting node to a controller, and FIG. 7 illustrates a user interface screen for the access of the starting node to the controller.

The starting node 201 needs to be authorized by the controller 202 to access the network or perform a reception operation. Accordingly, the first access control application 211 in the starting node 201 may attempt the access of the starting node to the controller by transmitting, to the controller 202, a request for generation of a control flow.

Referring to FIG. 6, in operation 605, the starting node 201 may sense an event for the access to the controller. For example, the starting node 201 may sense that the first access control application 211 is installed and executed in the starting node 201, and a request for the access to the controller 202 is made through the first access control application 211.

For example, referring to FIG. 7, when the first access control application 211 is executed, the starting node 201 may display a user interface screen 710 to receive information necessary for the access to the controller. The user interface screen 710 may include an input window 711 for entering an IP or domain of the controller 202, an input window 712 for entering a user ID, and/or an input window 713 for entering a password. After information about the input windows 711 to 713 is input, the starting node 201 may sense the event for the access to the controller by receiving a button 714 for the access to the controller by the authenticated user. For another example, when the user authentication of the starting node 201 is not completed yet, the starting node 201 may sense the event for the access to the controller by receiving a button 715 for the access to the controller by the unauthorized user (i.e., a guest).

In operation 610, the starting node 201 may transmit, to the controller 202, a request for the access to the controller 202, in response to sensing the event for the access to the controller 202. The starting node 201 may transmit the request for the access to the controller 202 through the first access control application 211. According to an embodiment, the first access control application 211 may transmit, to the controller 202, identification information (e.g., a terminal ID, an IP address, a MAC address) of the starting node 201, the type of the starting node 201, the position of the starting node 201, the environment of the starting node 201, identification information of a network to which the starting node 201 belongs, and/or the identification information of the first access control application 211.

In operation 615, the controller 202 may determine whether the access of the starting node 201 is allowed, in response to the received request. According to an embodiment, the controller 202 determine whether the access of the starting node 201 is allowed, based on a database included in the memory (e.g., the memory 330 of FIG. 3) of the controller 202. For example, the controller 202 may determine whether the access of the starting node 201 is allowed, based on whether information received from the first access control application 211 is included in the access policy database and based on whether identification information about the starting node 201 and/or the information about the network to which the starting node 201 belongs is included in the blacklist database.

When the access of the starting node 201 is allowed, the controller 202 may generate a control flow between the starting node 201 and the controller 202. In this case, the controller 202 may generate identification information of the control flow in the form of a random number and store, in a control flow table, the identification information about the starting node 201 and/or the information about the network to which the starting node 201 belongs. Information (e.g., the identification information of the control flow and/or the identification information of the control flow) stored in the control flow table may be used for authenticating a user of the starting node 201, updating information on the starting node 201, identifying a policy for network connection of the starting node 201, and/or validating the policy.

When the control flow is generated, in operation 620, the controller 202 may transmit a response to the request for the access to the controller, to the starting node 201. In this case, the controller 202 may transmit the identification information of the generated control flow to the starting node 201.

In operation 625, the starting node 201 may process a result value depending on the received response. For example, the first access control application 211 may store the received identification information of the control flow and display, to the user, as a user interface screen image to show that the access to the controller is completed. When the access to the controller is completed, a network access request of the starting node 201 to the destination network or a network reception request of the starting node 201 from the starting network may be controlled by the controller 202.

According to another embodiment, the controller 202 may determine that the access of the starting node 201 is failed. For example, when the identification information about the starting node 201 and/or the information about the network to which the starting node 201 belongs are included in the blacklist database, the controller 202 may determine that the access of the starting node 201 is failed. In this case, the controller 202 may transmit a response indicating that the access of the starting node 201 to the controller is failed, in operation 620, instead of generating the control flow in operation 615.

When receiving the response indicating that the access of the starting node 201 to the controller is failed, the starting node 201 may output, to the user, a user interface screen to display that the access of the starting node 201 to the controller is failed. For example, in operation 625, referring to FIG. 7, the starting node 201 may display a user interface screen 720 through the first access control application 211. The user interface screen 720 displays that the access of the starting node 201 is denied, and may include a user interface 725 for inducing that the access denied is allowed through an operator (e.g., the controller 202).

Figure 8:
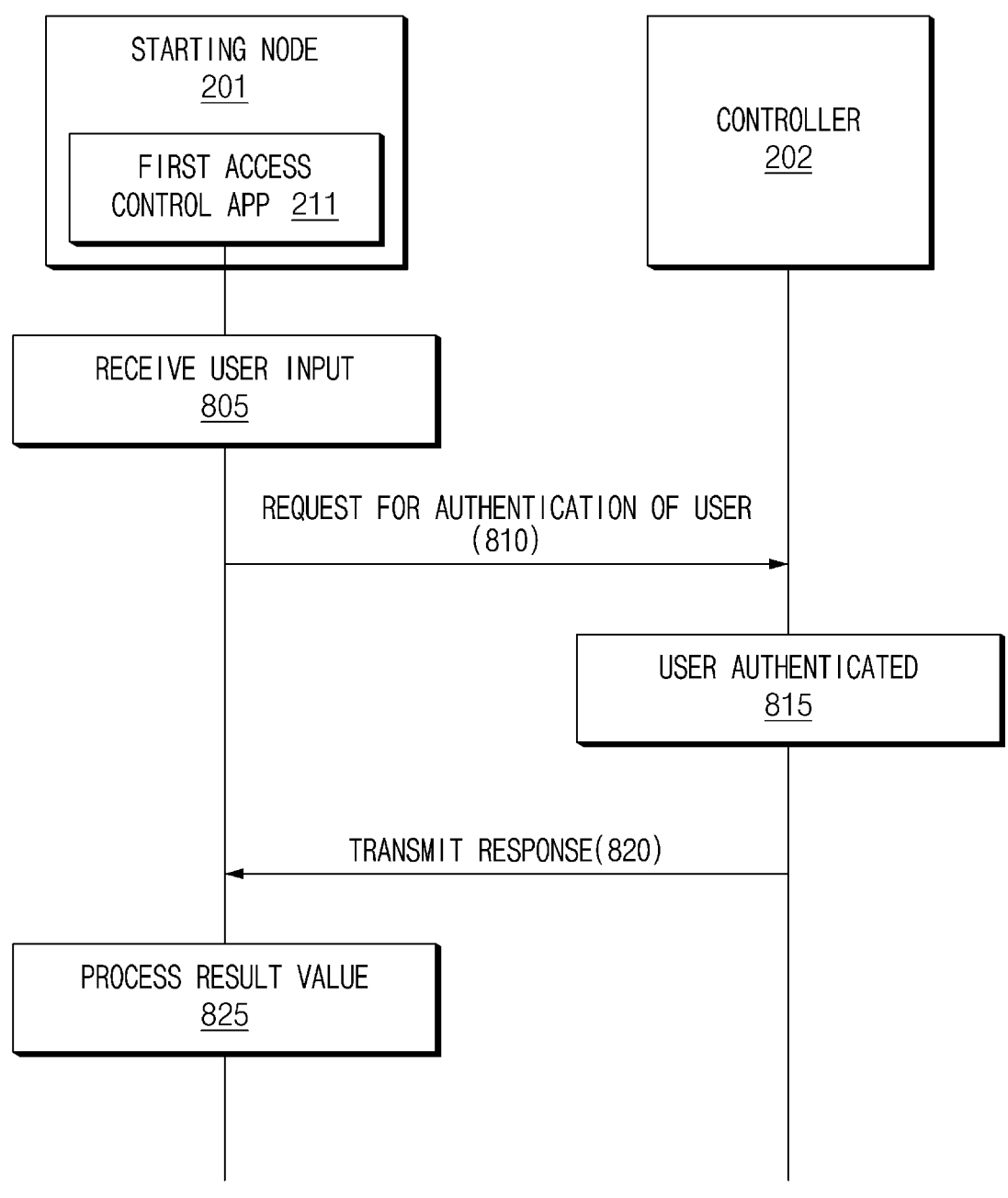
FIG. 8 is a signal flowchart for authenticating a user at a starting node, according to various embodiments.

FIG. 8 is a signal flowchart for authenticating a user at a starting node according to various embodiments.

The user of the starting node 201 may be authenticated by the controller 202 through the first access control application 211 in the starting node 201, such that the starting node 201 receives a detailed access authority over a destination network.

Referring to FIG. 8, in operation 805, the starting node 201 may receive an input for authenticating the user. The input for authenticating the user may be, for example, a user input for inputting a user ID and a password. For another example, the input for authenticating the user may be a user input (e.g., biometrics information) for more enhanced authentication.

In operation 810, the starting node 201 may transmit a request for authentication of the user, to the controller 202. For example, the first access control application 211 may transmit input information for authenticating the user to the controller 202. When a control flow between the starting node 201 and the controller 202 is already generated, the first access control application 211 may transmit information input for authenticating the user together with the identification information of the control flow.

In operation 815, the controller 202 may authenticate the user, based on the information received from the starting node 201. For example, the controller 202 may determine whether the access of the user is allowed based on the access policy and whether the user is included in the blacklist, based on the user ID, password, and/or enhanced authentication information included in the received information and a database (e.g., the access policy database 311 or the blacklist database 314 of FIG. 3) included in the memory of the controller 202.

When the user is authenticated, the controller 202 may add the user identification information (e.g., a user ID) to the identification information of the control flow. The added user identification information may be used for the access of the authenticated user to the controller or the network.

In operation 820, the controller 202 may transmit information indicating that the user is authenticated, to the starting node 201 in response to the request for the authentication of the user.

In operation 825, the starting node 201 may process a result value for the user authentication. For example, the starting node 201 may output a user interface screen to display that the user authentication is completed, through the display.

According to another embodiment, the controller 202 may determine that the user authentication is failed. For example, when information about the user identification is included in the blacklist database, the controller 202 may determine that the user authentication is failed. In this case, in operation 820, the controller 202 may transmit information indicating that the user authentication is failed, to the starting node 201, and in operation 825, the starting node 201 may output the user interface screen to display that the user authentication is failed, through the display.

Figure 9:
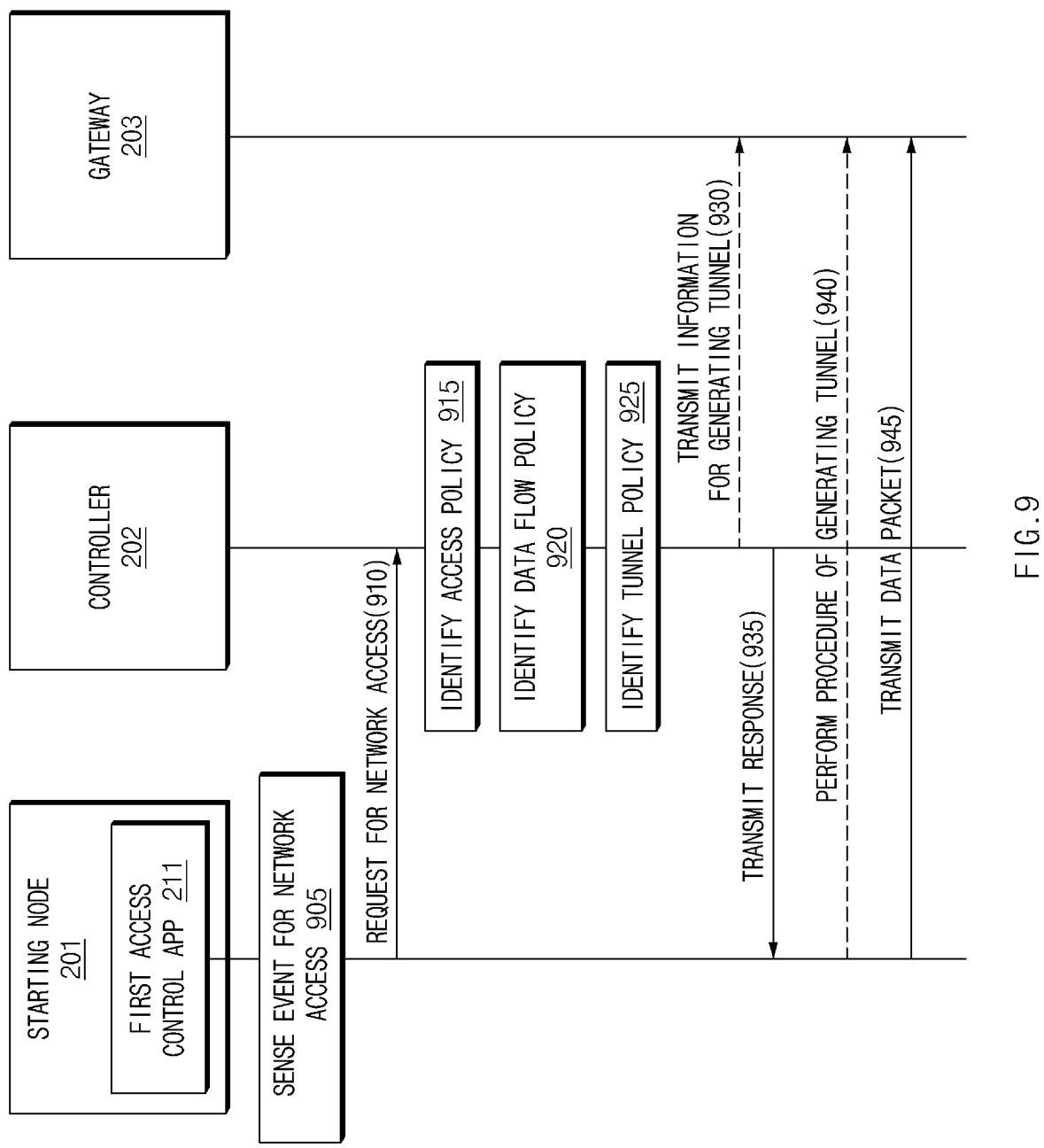
FIG. 9 is a signal flowchart for controlling network access at a starting node, according to various embodiments.

FIG. 9 illustrates an operation for controlling network access according to various embodiments. FIG. 9 is a signal flowchart for controlling network access.

After the starting node 201 is authenticated by the controller 202, the starting node 201 may ensure transmission of trusted data by controlling network access by different applications stored in the starting node 201 through the first access control application 211 in the starting node 201.

Referring to FIG. 9, in operation 905, the first access control application 211 may sense an event for network access. For example, the first access control application 211 may sense that a target application, such as a web browser, attempts to access a destination network including the destination node 204 such as the Internet. For example, a user may execute a web browser, and input and call a web address to be accessed.

In operation 910, the first access control application 211 may transmit, to the controller 202, a request for the network access of the target application. In this case, the first access control application 211 may transmit identification information of the target application and identification information (e.g., the IP of the destination node or information about a service port) of the destination node (e.g., the destination node 204), to the controller 202, together with the identification information of the control flow generated between the starting node 201 and the controller 202.

In operation 915, the controller 202 may identify the access policy based on the request received from the first access control application 211 and the database of the controller 202. For example, the controller 202 may determine whether the access to the target application is allowed based on whether the information received from the first access control application 211 satisfies the access policy included in the database of the controller 202. When the access of the target application is failed, the controller 202 may transmit information indicating that the access is failed to the starting node 201 in operation 935. In this case, the first access control application 211 may drop a data packet of the target application and output a user interface screen to display that the network access is failed through a display.

When the access to the target application is allowed, in operation 920, the controller 202 may identify the presence of a data flow including a database, which is included in the controller 202, the identification information (e.g., IP of the starting node 201) of the starting node 201, and the identification information (e.g., the IP of the destination node or the service port information) of the destination node (e.g., the destination node 204 of FIG. 2). According to an embodiment, the controller 202 may identify the presence of a data flow including identification information of a receive application of the destination node. According to an embodiment, when the data flow is absent, in operation 935, the controller 202 may notify that the access is failed, to the starting node 201. In this case, the first access control application 211 may drop a data packet of the target application and output a user interface screen to display that the access of the network is failed.

When the data flow is present, in operation 925, the controller 202 may determine whether an authorized tunnel is present between the target application and the gateway 203 for the destination node (e.g., the destination node 204 of FIG. 2). For example, the controller 202 may identify a tunnel end point (TEP) and/or tunnel type in a tunnel policy corresponding to the destination node 204, and may determine whether the authorized tunnel corresponding to the identified TEP is present in the tunnel table. When the authorized tunnel is present, the controller 202 may generate a tunnel ID of the previously generated tunnel and information included in the data flow table, and may transmit the generated information to the starting node 201 in operation 935. When the authorized tunnel is absent, the controller 202 may update information (e.g., a tunnel type, a scheme, authentication information, and/or an IP and a port of the TEP) necessary and a data flow necessary for generating a tunnel, and may transmit the generated information to the gateway 203 and the starting node 201 (operation 930 and 935).

For another example, when any tunnel among tunnels to be generated between the starting node 201 and the gateway 203 fails to satisfy the tunnel policy, the controller 202 may notify that the network access is failed, to the starting node 201, in operation 935. In this case, the first access control application 211 may drop the data packet of the target application and display the user interface screen to show that the network access is failed.

According to an embodiment, the first access control application 211 may process a result value depending on a response transmitted from the controller 202. According to an embodiment, when receiving, from the controller 202, information that the network access of the target application is failed or that the authorized tunnel is absent, the first access control application 211 may drop the data packet and output the user interface screen to display that the network access is failed.

According to another embodiment, when information necessary for generating the tunnel is received from the controller 202, the first access control application 211 may generate a tunnel together with the gateway 203 in operation 940, and may transmit the data packet of the target application to the gateway 203 through the tunnel generated in operation 945. In this case, when the data packet is received through the authorized tunnel, the gateway 203 may forward the received data packet to a destination (e.g., the destination node).

According to another embodiment, when the tunnel ID of the existing tunnel is received from the controller 202, the first access control application 211 may transmit the data packet of the target application to the gateway 203 through a tunnel corresponding to the tunnel ID in operation 945, without performing the procedure for generating an additional tunnel.

According to another embodiment, when the generating of the tunnel is failed, the first access control application 211 may drop the data packet of the target application and display the user interface screen to show that the network access is failed.

According to an embodiment, the first access control application 211 may first determine whether a data flow authorized from the controller 202 is present between the target application and the destination node (e.g., the destination node 204 of FIG. 2) before performing operation 910. For example, the first access control application 211 may identify identification information of the target application, identification information of the destination node (e.g., the destination IP), and information about a service port, and may determine whether an authorized data flow corresponding to the information identified is present in the data flow table stored in the memory of the starting node 201. When the authorized data flow is present, the first access control application 211 may transmit the data packet of the target application based on the data flow policy authorized in operation 945 without the request for the network access. When the authorized data flow is absent, the first access control application 211 may transmit the request for the network access in operation 910. Meanwhile, when the authorized data flow is not valid even though the authorized data flow is present (e.g., when the tunnel is absent or the access to the destination node is failed), the first access control application 211 may drop the data packet of the target application.

According to an embodiment, the first access control application 211 may further verify the validity of the target application, before transmitting the request for the network access, to ensure the integrity and the stability of the target application. For example, the first access control application 211 may check forging, falsifying, code-signing, and/or fingerprint with respect to the target application. For another example, the first access control application 211 may determine whether the access to the target application, the IP, which is to be accessed, and the service port is allowed based on the access policy database received from the controller 202. For example, when the validation of the target application is failed, the first access control application 211 may drop a data packet of the target application without the request for the network access. In this case, the first access control application 211 may display the user interface screen to show that the network access is failed. For another example, when the validation of the target application is successful, the first access control application 211 may transmit the request for the network access in operation 910.

Figure 10:
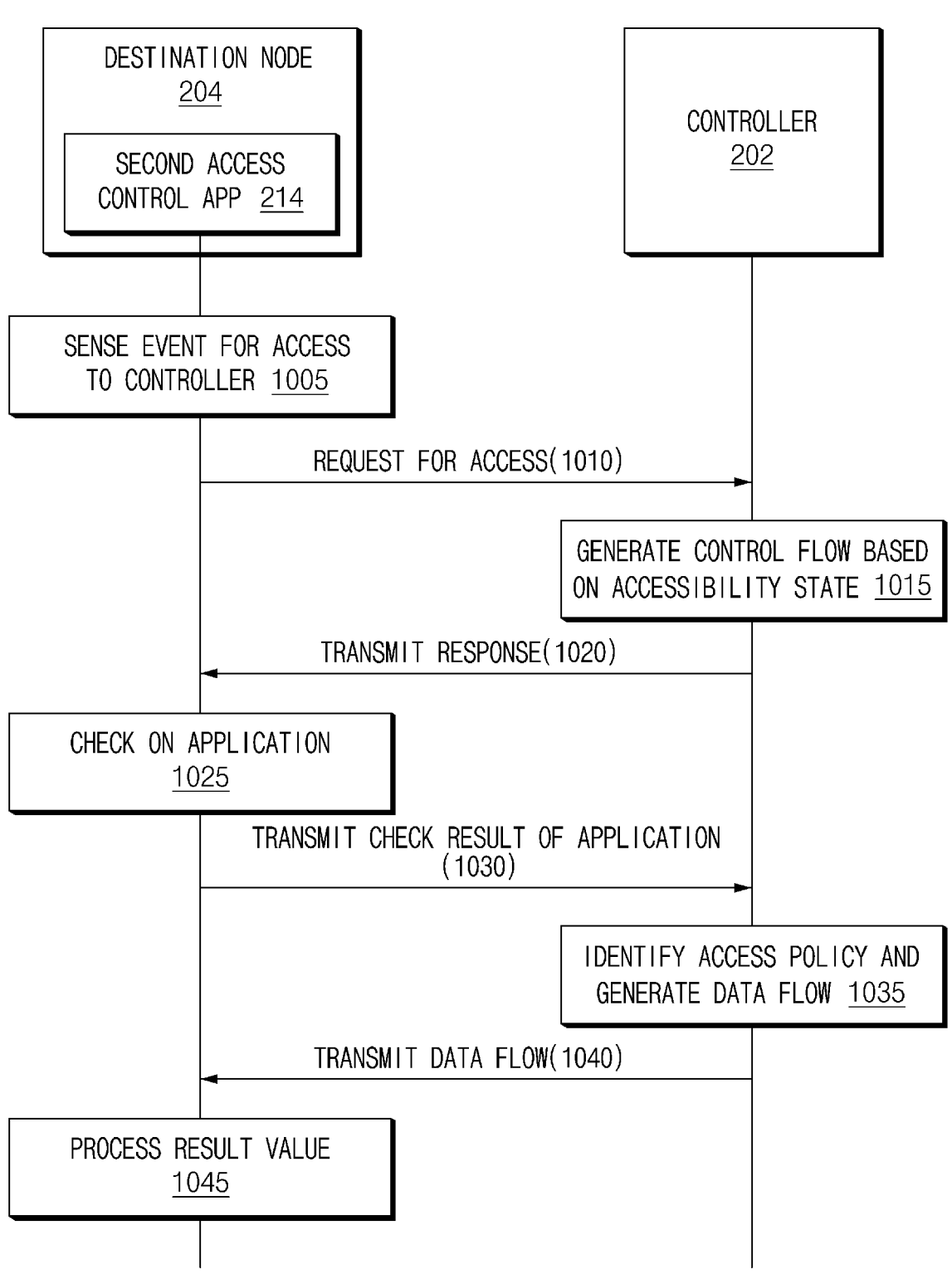
FIG. 10 is a signal flowchart for the access of a destination node to a controller, according to various embodiments.

FIG. 10 is a signal flowchart for the access of a destination node to a controller according to various embodiments.

The destination node 204 needs to be authorized by the controller 202 to access a network or to perform a network reception operation. Accordingly, the second access control application 214 in the destination node 204 may attempt to access of the destination node 204 to the controller by transmitting, to the controller 202, a request for generation of the control flow.

The destination node 204 may perform an operation substantially the same as the operation that the starting node 201 of FIG. 6 accesses the controller 202 through the first access control application 211, to access the controller 202 through the second access control application 214. For example, operation 1005 and operation 1010 may be substantially the same as operation 605 and operation 610 of FIG. 6, respectively. In addition, the controller 202 may perform operation 1015 substantially the same as operation 615 of FIG. 6, to generate the control flow with the second access control application 214.

In operation 1020, the controller 202 may transmit a response to operation 1010. For example, the controller 202 may transmit a response including identification information of the control flow generated in operation 1015, information about an application allowing reception, and information about a service port allowing reception. For example, the information about the application allowing reception and the information about the service port allowing reception may be in a white list generated by the controller 202 based on the access policy.

In operation 1025, the second access control application 214 in the destination node 204 may perform the check on the application. For example, the second access control application 214 may perform the check on the application based on information about an application allowing reception and information about a service port allowing reception, which are received from the controller 202. The second access control application 214 may determine whether the application allowing reception is present and executed, based on the information about the application allowing reception. In addition, the second access control application 214 may determine whether the application present and being executed at the destination node 204 is receiving through the service port allowing reception. According to an embodiment, the second access control application 214 may perform a validation check on the received application. For example, the second access control application 214 may check on integrity and stability of the received application (e.g., check forging, falsifying, code-signing, and/or finger-print with respect to the application)

In operation 1030, the second access control application 214 may transmit, to the controller 202, the check result of the application. For example, the second access control application 214 may transmit, to the controller 202, the presence state of the application allowing reception, whether the application allowing reception is executed, or and whether the application allowing reception is being received through the service port allowing reception. According to an embodiment, the second access control application 214 may transmit the check result of the validity of the application received, to the controller 202.

In operation 1035, the controller 202 may generate a data flow based on the access policy, which is stored in the database, based on the identification information of the application and the check result of the application, which are received from the destination node 204. For example, the controller 202 may generate the data flow including identi-fication information of the starting node 201, which is identified in advance or the identification information of the starting network including the starting node 201, based on the access policy. For another example, when the identified starting node 201 or the starting network including the starting node 201 is absent and when a data packet is received, the controller 202 may generate a data flow including a flag which may be queried to the controller 202 such that the destination node 204 identifies the starting node 201 or the starting network including the starting node 201. According to an embodiment, the controller 202 may update an existing data flow table (e.g., data flow table 317 of FIG. 3) with the data flow generated based on the identification information of the received application and the check result of the application.

In operation 1040, the controller 202 may transmit the generated data flow to the destination node 204.

In operation 1045, the destination node 204 may process a result value depending on the received response. For example, the second access control application 214 may store the received identification information of the control flow and display, to a user, a user interface screen image to show that the access to the controller is completed. When the access to the controller is completed, a request for network reception of the destination node 204 from the starting network or a request for network transmission of the desti-nation node 204 to the starting network may be controlled by the controller 202.

According to another embodiment, the controller 202 may determine that the access of the destination node 204 is failed. For example, when the identification information about the destination node 204 and/or the information about the network to which the destination node 204 belongs are included in the blacklist database, the controller 202 may determine that the access of the destination node 204 is failed. In this case, the controller 202 may transmit a response indicating that the access of the destination node 204 to the controller is failed, in operation 1020, instead of generating the control flow in operation 1015.

When receiving the response indicating that the access of the destination node 204 to the controller is failed, the destination node 204 may output, to the user, a user interface screen to display that the access of the destination node 204 to the controller is failed. According to an embodiment, the second access control application 214 in the destination node 204 may not perform operations 1025 to 1040 when the access to the controller is failed.

According to an embodiment, the second access control application 214 in the destination node 204 may receive the data flow generated from the controller 202 through opera-tion 1040, and may update the existing data flow table with the data flow received in operation 1045 or store the data flow received in operation 1045 in an existing data flow table.

According to an embodiment of the present disclosure, the second access control application 214 in the destination node 204 and the controller 202 may prevent a long round trip by checking whether an application installed on the destination node 204 is running or receiving a data packet at a designated service port before the data packet is received in the destination node 204 through the operation illustrated in FIG. 10.

Figure 11:
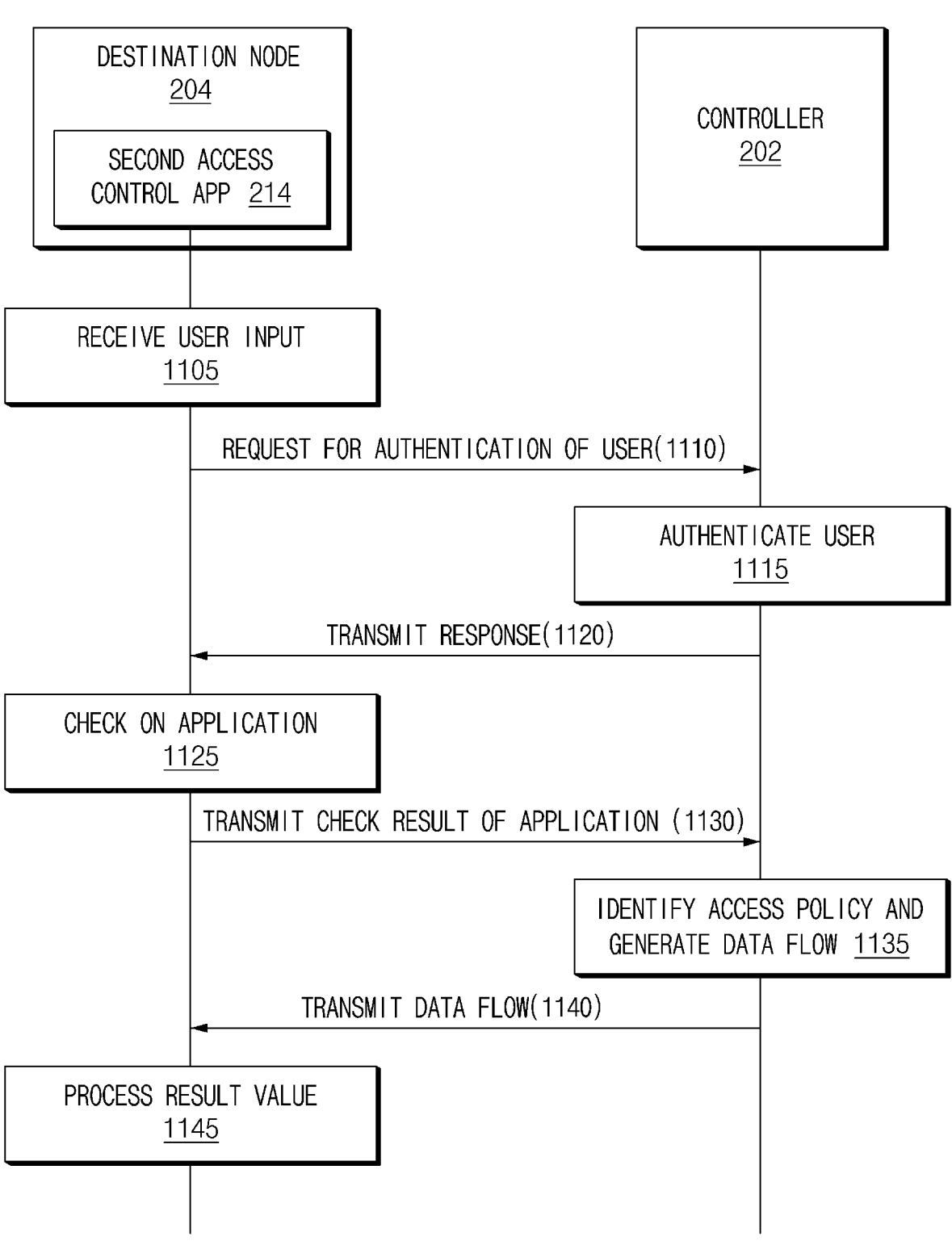
FIG. 11 is a signal flowchart for authentication of a user of a destination node, according to various embodiments.

FIG. 11 is a signal flowchart for authenticating a user of a starting node according to various embodiments.

A user of the destination node 204 is authenticated by the controller 202 through the second access control application 214 in the destination node 204, such that the destination node 204 receives a detailed access authority over a desti-nation network.

The destination node 204 may perform an operation substantially the same as the operation that the starting node 201 of FIG. 6 authenticates a user through the first access control application 211, to authenticate a user with respect to the controller 202 through the second access control appli-cation 214. For example, operation 1105 and operation 1110 may be substantially the same as operation 805 and opera-tion 810 of FIG. 8, respectively. In addition, the controller 202 may perform operation 1115 substantially the same as operation 815 of FIG. 8 to authenticate the user of the second access control application 214 or the destination node 204.

In operation 1120, the controller 202 may transmit a response to operation 1110. For example, the controller 202 may transmit a response including identification information of the control flow added with the identification information of the user in operation 1115, information about an application allowing reception, and information about a service port information allowing reception. For example, the information about the application for reception and the information about the service port allowing reception may be in a white list generated by the controller 202 based on the access policy.

In operation 1125, the second access control application 214 in the destination node 204 may check on an application. For example, the second access control application 214 may check on the application based on the information about the application for reception and the information about the service port allowing reception, which are received from the controller 202. The second access control application 214 may check whether the application allowing the reception is present and executed, based on the information about the application information allowing reception. In addition, the second access control application 214 may determine whether the application present and being executed at the destination node 204 is receiving through the service port allowing reception. According to an embodiment, the second access control application 214 may perform a validation check on the receiving application. For example, the second access control application 214 may check on integrity and stability of the received application (e.g., check forging, falsifying, code-signing, and/or fingerprint with respect to the application)

In operation 1130, the second access control application 214 may transmit, to the controller 202, the check result of the application. For example, the second access control application 214 may transmit, to the controller 202, the presence and execution state of the application allowing reception, and whether the application allowing reception is being received through the service port allowing the reception. According to an embodiment, the second access control application 214 may transmit a result of the validation check of the received application to the controller 202.

In operation 1135, the controller 202 may generate a data flow based on the access policy, which is stored in the database, based on the identification information of the application received from the destination node 204 and the check result of the application. For example, the controller 202 may generate a data flow including identification information of the starting node 201 identified in advance or the identification information of the starting network including the starting node 201 based on the access policy. For another example, when the identified starting node 201 or the starting network including the starting node 201 is absent, and when the data packet is received, the controller 202 may generate a data flow including a flag which may be queried to the controller 202 such that the destination node 204 identifies the starting node 201 or the starting network including the starting node 201. According to an embodiment, the controller 202 may update an existing data flow table (e.g., the data flow table 317 of FIG. 3) with the data flow generated based on the identification information of the received application and the check result of the application.

In operation 1140, the controller 202 may transmit the generated or updated data flow to the destination node 204.

According to an embodiment, operations 1125 to 1140 may not be performed, when operations 1125 to 1140 are performed the step of the access to the controller of FIG. 10.

In operation 1145, when the data flow generated from the controller 202 is received, the second access control application 214 in the destination node 204 may update the existing data flow table with the data flow by storing the data flow in the existing data flow table. For example, the destination node 204 may output a user interface screen to display that the user authentication is completed, through the display, when the user authentication in the controller 202 is successful.

According to another embodiment, the controller 202 may determine that the user authentication is failed. For example, when the user identification information is included in the blacklist database, the controller 202 may determine that the user authentication is failed. In this case, in operation 1120, the controller 202 may transmit information indicating that the user authentication is failed, to the destination node 204, and in operation 1145, the destination node 204 may output the user interface screen to display that the user authentication is failed, through the display. In this case, operations 1125 to 1140 may not be performed.

Figure 12:
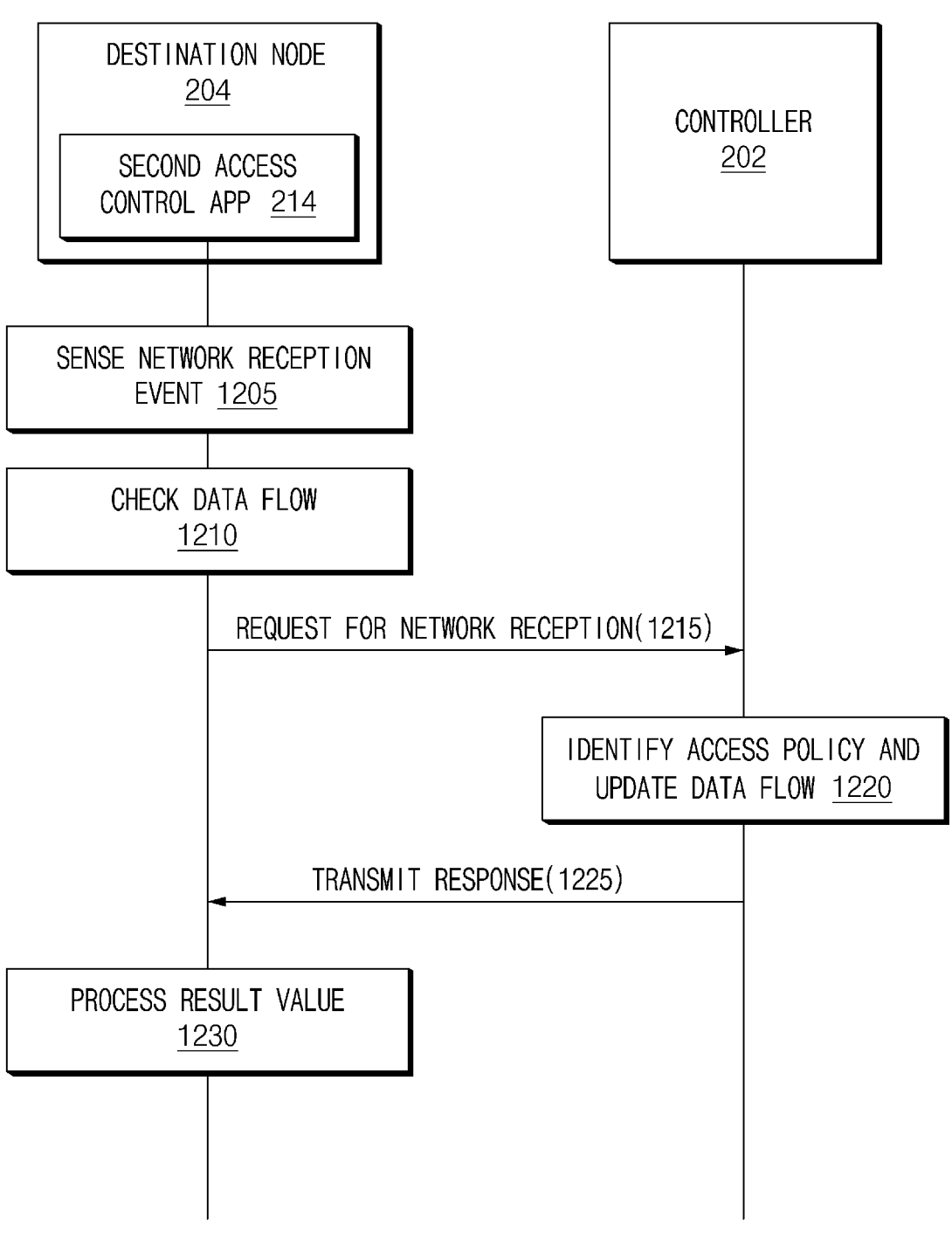
FIG. 12 is a signal flowchart for controlling network reception operation at a destination node, according to various embodiments.

FIG. 12 is a signal flowchart for controlling network reception at a destination node, according to various embodiments.

After the destination node 204 is authenticated by the controller 202, the destination node 204 may ensure reception of trusted data by controlling network reception of different applications stored in the destination node 204 through the second access control application 214 in the second node 204.

Referring to FIG. 12, in operation 1205, the second access control application 214 in the destination node 204 may sense a network reception event from the starting network. For example, the second access control application 214 may sense a request for reception of a data packet from the starting network. In this case, the second access control application 214 may identify the service port and identification information of the starting network which are included in the data packet from the starting network.

In operation 1210, the second access control application 214 may check a data flow. For example, the second access control application 214 may identify the presence of the data flow corresponding to the service port included in the data packet from the starting network and authorized from the controller 202. In this case, the second access control application 214 may determine whether the data flow corresponding to the service port included in the data packet from the starting network is present in the data flow table stored in the memory.

According to an embodiment, the second access control application 214 may drop the data packet when the data flow corresponding to the service port and authorized from the controller 202 is absent. In this case, operations 1215 to 1230 may not be performed.

According to another embodiment, the second access control application 214 may receive the data packet, when the data flow corresponding to the service port and authorized from the controller 202 is present and the authorized data flow includes the identification information of the starting network. In this case, operations 1215 to 1230 may not be performed.

According to still another embodiment, the second access control application 214 may perform operation 1215 when the data flow corresponding to the service port and authorized from the controller 202 is present but the authorized data flow fails to include the identification information of the starting network.

In operation 1215, the second access control application 214 may transmit, to the controller 202, a request for the network reception. For example, the request for the network reception may include identification information of a control flow, identification information of the starting network, and the service port. For another example, the request for the network reception may include the identification information of the control flow, the identification information of the starting network, and identification information of the authorized data flow identified in operation 1210. According to an embodiment, the request for the network reception for the controller 202 may further include identification information of a receive application.

In operation 1220, the controller 202 may determine whether the access of the destination node 204 is allowed, based on the identification information included in the request for the network reception from the destination node 204 and based on the database. For example, the controller 202 may determine whether the received identification information is included in the access policy corresponding to the identification information of the control flow. For another example, the controller 202 may identify the presence of the access policy or the data flow matched with the received and requested identification information. When the access of the destination node 204 is allowed, the controller 202 may generate a data flow including the identification information of the starting network and identification information requested to be received, or may update the existing data flow with the identification information of the starting network by adding the identification information of the starting network to the existing data flow.

In operation 1225, the controller 202 may transmit a response to operation 1215 to the second access control application 214 in the destination node 204. For example, the controller 202 may transmit a data flow including identification information of a receive application of the destination node 204, the identification information of the starting network, and the service port information of the destination node 204, to the second access control application 214.

According to another embodiment, when the access of the destination node 204 is failed, the controller 202 may transmit a result indicating that the access of the destination node 204 is failed.

In operation 1230, the second access control application 214 in the destination node 204 may process a response received from the controller 202. For example, when receiving the data flow, which is updated or generated, from the controller 202, the second access control application 214 may receive the data packet of the starting network, based on the data flow updated or generated. For another example, when receiving the result indicating that the access of the destination node 204 is failed, from the controller 202, the second access control application 214 may drop the data packet of the starting network.

Figure 13:
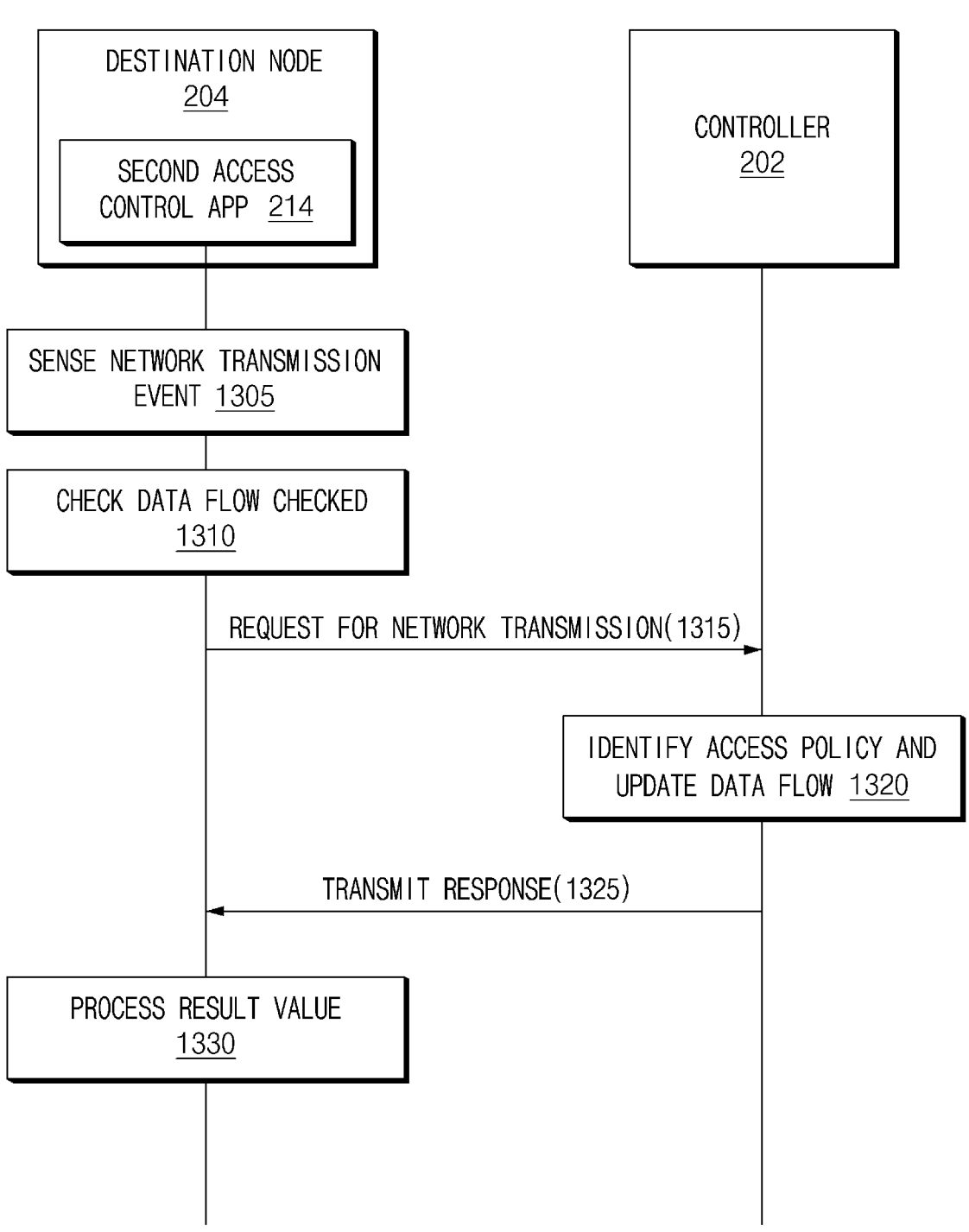
FIG. 13 illustrates a signal flowchart for controlling network transmission at a destination node, according to various embodiments.

FIG. 13 is a signal flowchart for controlling network transmission at a destination node, according to various embodiments.

After the destination node 204 is authenticated by the controller 202, when applications other than the second access control application 214, which are stored in the destination node 204, receive a data packet through the second access control application 214 in the destination node 204, the destination node 204 may control network transmission for transmitting a response data packet in response to the received data packet, thereby ensuring the reception of the trusted data. For example, the other applications stored in the destination node 204 may provide a trusted network environment by not transmitting the response data packet even when receiving a data packet from the starting network Referring to FIG. 13, in operation 1305, the second access control application 214 in the destination node 204 may sense the response of a receive application to the data packet which is received from the starting network and processed. For example, the second access control application 214 may sense a request for transmission of a response data packet of the receive application to the data packet received from the starting network and processed.

In operation 1310, the second access control application 214 may check a data flow. For example, the second access control application 214 may identify the presence of a data flow corresponding to the identification information of the destination node 204 and the identification information of the receive application.

According to an embodiment, the second access control application 214 may drop the data packet when the data flow corresponding to the identification information and the identification information of the receive application is present but is not valid. In this case, operations 1315 to 1330 may not be performed.

According to another embodiment, the second access control application 214 may transmit the response data packet to the received data packet, when the data flow corresponding to the identification information of the destination node 204 and the identification information of the receive application is present. In this case, operations 1315 to 1330 may not be performed.

According to still another embodiment, the second access control application 214 may perform operation 1315 when the data flow corresponding to the identification information of the destination node 204 and the identification information of the receive application is absent. According to an embodiment, before performing operation 1315, the second access control application 214 may perform a validation check on an application to which the data packet is to be transmitted. In this case, the second access control application 214 may perform a check (e.g., a check for an execution of an application, the forging state and the falsifying state of the application, the code-signing of the application, and the fingerprint of the application) for the integrity and stability of the application to which the data packet is to be transmitted.

In operation 1315, the second access control application 214 may transmit, to the controller 202, a request for the network transmission. For example, the request for the network transmission may include control flow identification information, identification information of the starting network (a network to which the response data packet is to be transmitted), and a service port (a service port of the starting node 201 of FIG. 2). For another example, the request for the network transmission may include the identification information of the control flow, the identification information of the starting network (the network to which the response data packet is to be transmitted), and identification information of the authorized data flow authorized in operation 1310. According to an embodiment, the request for the network transmission to the controller 202 may further include identification information of the receive application (an application to which the data packet is to be transmitted).

In operation 1320, the controller 202 may determine whether the access of the destination node 204 is allowed, based on the identification information included in the request for the network transmission, which is received from the destination node 204, and based on the database. For example, the controller 202 may determine whether the identification information included in the request for the network transmission is included in the access policy corresponding to the identification information of the control flow. For another example, the controller 202 may identify the presence of the access policy or the data flow matched with the identification information included in the request for the network transmission. When the access of the destination node 204 is allowed, the controller 202 may generate a data flow including the identification information of the starting network (the network to which the response data packet is to be transmitted) and the identification information included in the request for the network transmission, or may update an existing data flow with the identification information of the starting network (the network to which the response data packet is to be transmitted) by adding the identification information of the starting network (the network to which the response data packet is to be transmitted) to the existing data flow.

In operation 1325, the controller 202 may transmit a response to operation 1315 to the second access control application 214 in the destination node 204. For example, the controller 202 may transmit the data flow including identification information of the receive application (the application to which the data packet is to be transmitted) of the destination node 204, the identification information of the starting network (the network to which the response data packet is to be transmitted), and the information of the service port (the service port of the starting node 201 of FIG. 2), to the second access control application 214.

According to another embodiment, when the access of the destination node 204 is failed, the controller 202 may transmit a result indicating that the access of the destination node 204 is failed.

In operation 1330, the second access control application 214 in the destination node 204 may process a response received from the controller 202. For example, when receiving the data flow, which is updated or generated, from the controller 202, the second access control application 214 may transmit the data packet of the application for transmitting the response data packet, based on the data flow updated or generated. For another example, when receiving the result indicating that the access of the destination node 204 is failed, from the controller 202, the second access control application 214 may drop the data packet of the application for transmitting the response data packet.

Figure 14:
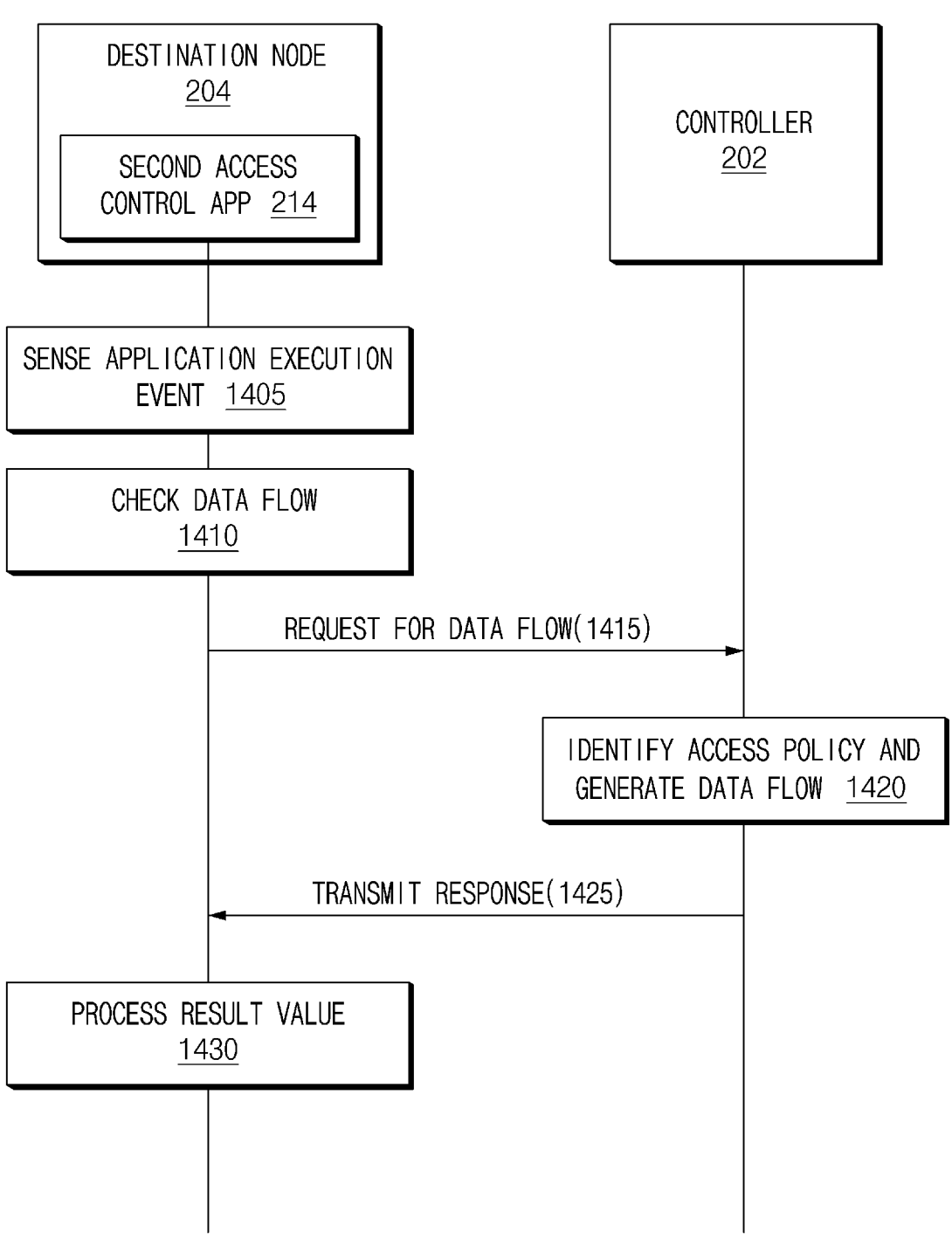
FIG. 14 illustrates a signal flowchart for executing an application at a destination node, according to various embodiments.
Figure 15:
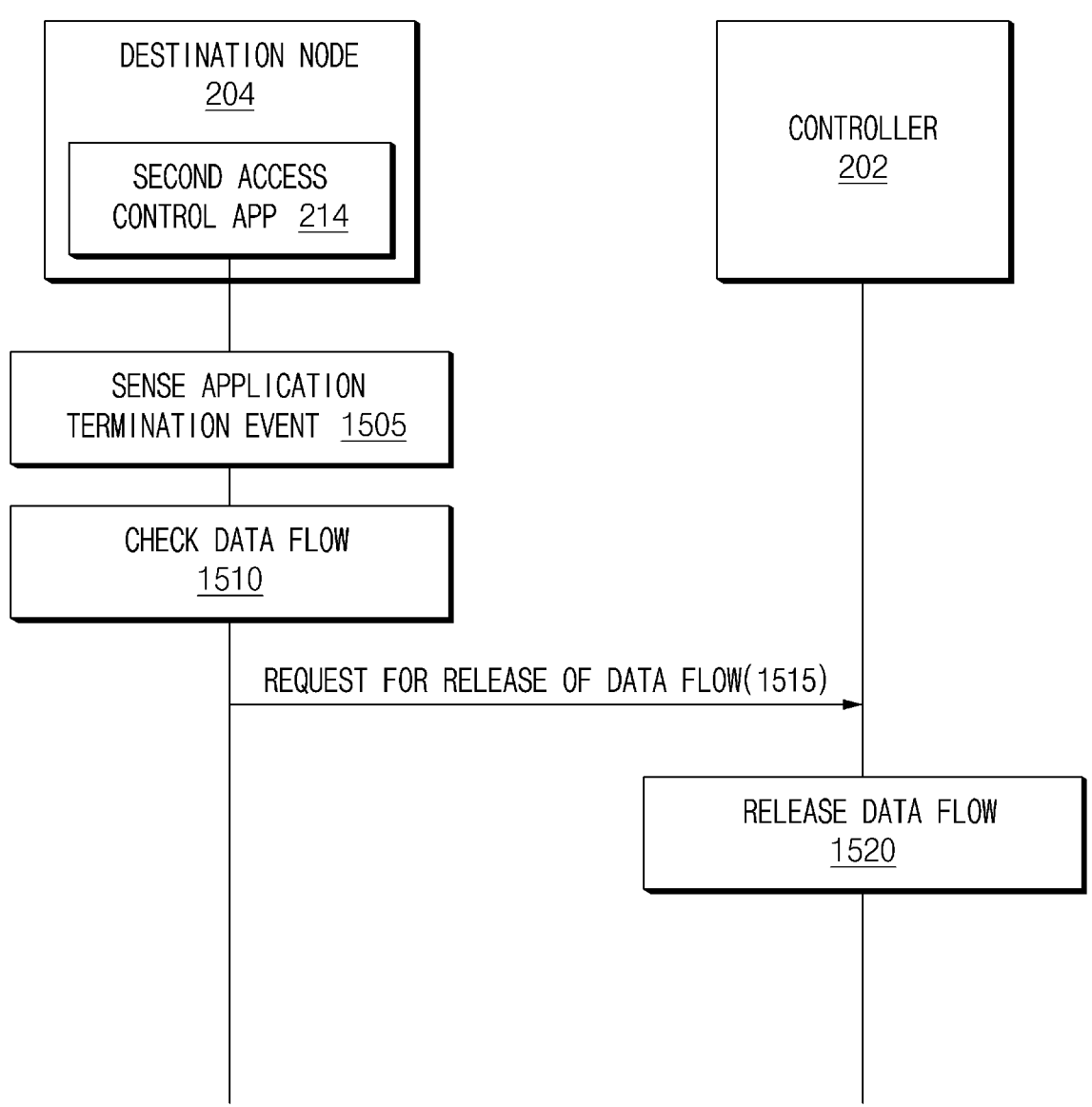
FIG. 15 illustrates a signal flowchart for terminating an application at a destination node, according to various embodiments.

FIG. 14 is a signal flowchart for executing an application at a destination node according to various embodiments, and FIG. 15 is a signal flowchart for terminating the application at a destination node according to various embodiments.

After the destination node 204 is authorized by the controller 202, the second access control application 214 in the destination node 204 constantly tracks an application waiting for network access or network reception based on an application execution event and an application termination event, thereby transmitting the application to the controller 202. The controller 202 may store the application waiting for the network access or the network reception in the form of a data flow in advance, thereby preventing Long Round Trip.

Referring to FIG. 14, in operation 1405, the second access control application 214 in the destination node 204 may sense the application execution event. For example, when the execution of the application stored in the destination node 204 is sensed, the second access control application 214 may determine whether the executed application is performing a network reception operation.

In operation 1410, when the executed application is performing the network reception operation, the second access control application 214 may identify the presence of a data flow, which is authorized, corresponding to identification information of the executed application and a service port for reception of the executed application. According to an embodiment, when the data flow, which is authorized, corresponding to the identification information of the executed application and the service port for reception of the executed application is absent, the second access control application 214 may transmit a request for the data flow to the controller 202 (operation 1415). According to another embodiment, when the data flow, which is authorized, corresponding to identification information of the executed application and the service port for reception of the executed application is present, the second access control application 214.

In operation 1420, the controller 202 may generate a data flow based on the access policy corresponding to the identification information of the executed application, which is received from the second access control application 214, and the service port for reception of the executed application. In addition, the controller 202 may update an existing data flow table (see reference numeral 317 of FIG. 3) with the generated data flow by adding the generated data flow into the existing data flow table. According to an embodiment, the generated data flow may further include identification information, which is previously identified, of the starting network. According to another embodiment, when the identification information, which is previously identified, of the starting network is absent, and when a data packet is received through a data flow which is generated thereafter, the generated data flow may further include a flag which queries the controller 202.

In operation 1425, the controller 202 may transmit the generated data flow to the second access control application 214 in the destination node 204. When the generated data flow is present in a response received from the controller 202, the second access control application 214 may update the existing data flow table based on the generated data flow (operation 1430).

Referring to FIG. 15, in operation 1505, the second access control application 214 in the destination node 204 may sense the application termination event. For example, the second access control application 214 may sense that an application, which is being executed, is terminated.

In operation 1510, the second access control application 214 may identify presence of a data flow, which is authorized, corresponding to the identification information of the application which is terminated. According to an embodiment, when the data flow, which is authorized, corresponding to the identification information of the application which is terminated is absent, the access control application 214 may not perform operations 1515 and 1520. According to another embodiment, when the data flow, which is authorized, corresponding to the identification information of the application terminated is present, the second access control application 214 may release the data flow corresponding to the identification information of the application terminated.

In operation 1515, the second access control application 214 may transmit, to the controller 202, a request for removing the data flow corresponding to the identification information of the application which is terminated. In response to the request of the second access control application 214, the controller 202 may release the data flow corresponding to the identification information of the application which is terminated (operation 1520). Accordingly, the application, which is terminated, of the destination node 204 becomes to be in a state that the starting network cannot access the application.

Although FIGS. 14 and 15 illustrate that the second access control application 214 in the destination node 204 transmits information about the execution or the termination of the application to the controller 202, when the application installed in the destination node 204 is executed and/or terminated, the present disclosure is not limited thereto. For example, even a first access control application (e.g., the first access control application 211 of FIG. 2) in a starting node (e.g., the starting node 201 of FIG. 2) may process the information about the execution or the termination the an application together with the controller 202, when the application executed and/or terminated in the starting node is present.

Figure 16:
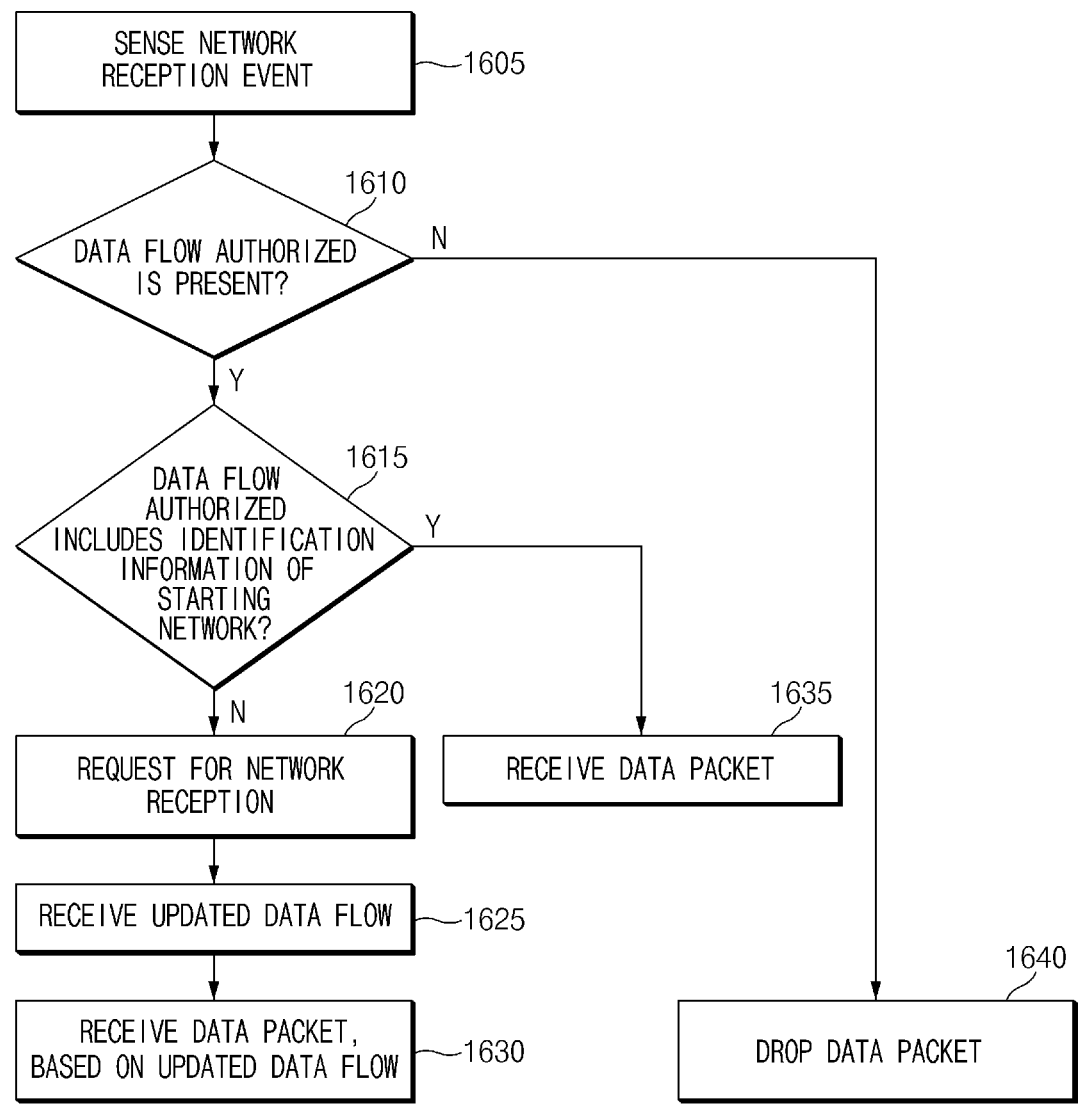
FIG. 16 illustrates a flowchart for controlling network reception at a destination node, according to various embodiments.

FIG. 16 illustrates a flowchart for controlling network reception at a destination node, according to various embodiments. The operations illustrated in FIG. 6 may be performed through the destination node 204 of FIG. 2 or the second access control application 214 included in the destination node 204.

Referring to FIG. 16, in operation 1605, the second access control application 214 in the destination node 204 may sense a network reception event. For example, the second access control application 214 may sense the network reception event by sensing a request for reception of a data packet from the starting network.

In operation 1610, the second access control application 214 may determine whether a data flow authorized is present. For example, the second access control application 214 may identify the identification information of the service port and the identification information of the starting network, which are included in the data packet from the starting network, and may identify the presence of the data flow corresponding to the service port and authorized from the controller 202. According to an embodiment, when the authorized data flow corresponding to the service port included in the data packet received from the starting network is absent, the second access control application 214 may drop the data packet (operation 1640).

When the authorized data flow corresponding to the service port included in the data packet from the starting network is present, in operation 1615, the second access control application 214 may determine whether the authorized data flow includes the identification information of the starting network. According to an embodiment, when the authorized data flow includes the identification information of the starting network, the second access control application 214 may receive the data packet from the starting network (operation 1635).

When the authorized data flow fails to include the identification information of the starting network, the second access control application 214 may transmit, to the controller 202, the request for the network reception in operation 1620. For example, the request for the network reception may include identification information of the starting network, and information about the service port. For example, the request for the network reception may include identification information of the identified data flow and the identification information of the starting network. According to an embodiment, the request for the network reception may include identification information of the control flow for identifying the destination node 204 or the second access control application 214.

In operation 1625, the second access control application 214 may receive an updated data flow from the controller 202. For example, the updated data flow may include identification information of the starting network.

In operation 1630, the second access control application 214 may receive the data packet of the starting network based on the updated data flow received from the controller 202. According to an embodiment, when the updated data flow is not received in operation 1625, the second access control application 214 may drop the data packet of the starting network.

Figure 17:
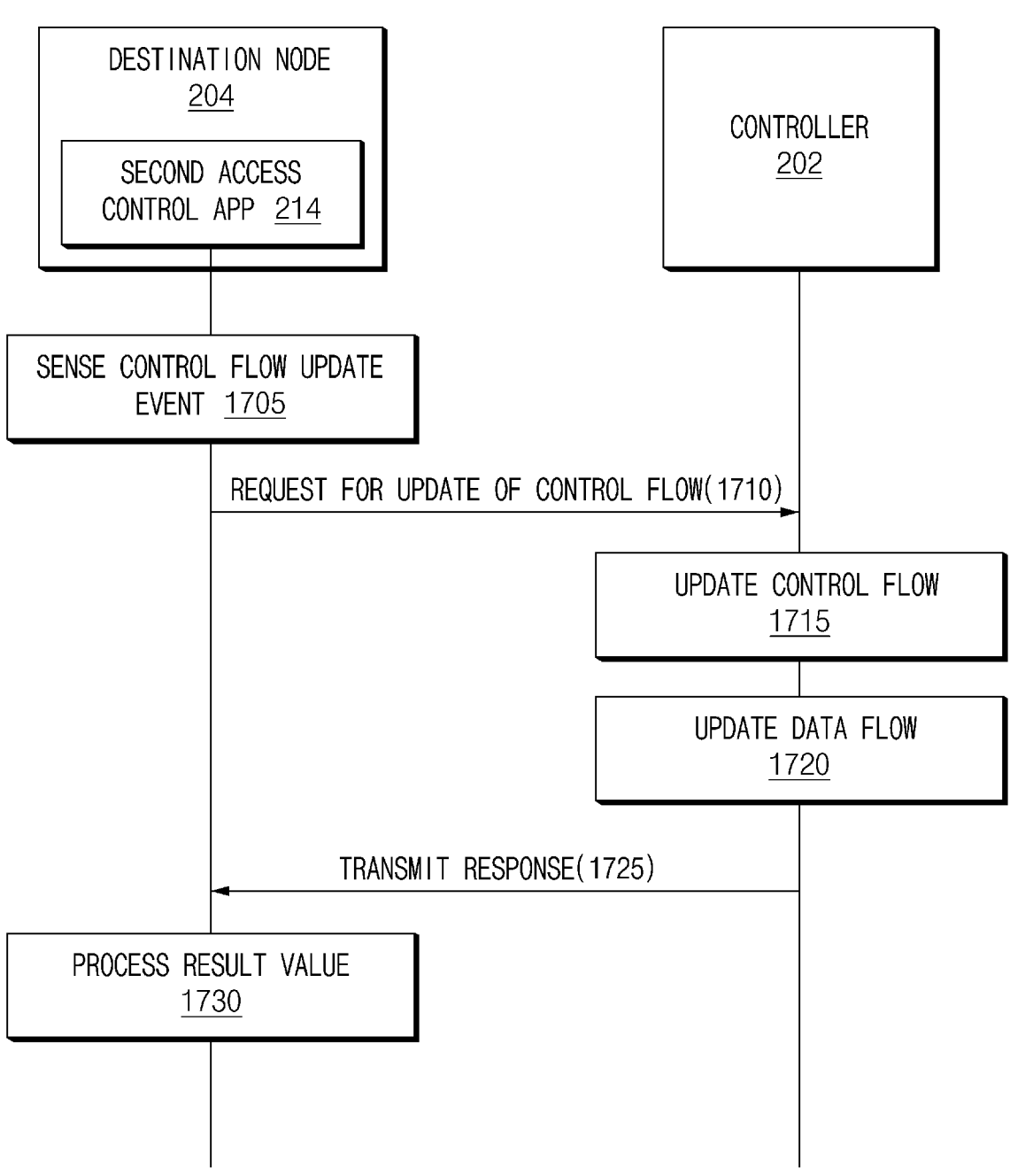
FIG. 17 illustrates a signal flowchart for updating a control flow at a destination node, according to various embodiments.

FIG. 17 illustrates a signal flowchart for updating a control flow at a destination node, according to various embodiments.

The destination node 204 may receive information about a changed data flow from the controller 202 by updating a control flow in a specific cycle. Although FIG. 17 illustrates an operation of updating the control flow at the destination node 204, the present disclosure is not limited thereto. For example, the starting node 201 of FIG. 2 may perform the operations of FIG. 17.

Referring to FIG. 17, in operation 1705, the destination node 204 may sense a control flow update event. For example, the second access control application 214 may sense the control flow update event in the specific cycle.

In operation 1710, a destination node 601 may transmit, to the controller 202, a request for update of the control flow. The requested information may include identification information of a control flow between the destination node 204 and the controller 202.

In operation 1715, the controller 202 may determine whether the access of the destination node 204 is allowed, in a manner similar to that in operation 1015 of FIG. 10 and may update the control flow based on the determined result. Meanwhile, when the control flow identified based on the identification information of the control flow is not valid, the controller 202 may transmit information about the failure of updating the control flow to the destination node 204 through operation 1725.

When the control flow is updated, the controller 202 may update a data flow, in which identification information of accessible applications and identification information about access targets are listed, by identifying the access policy matched with the identified information (e.g., identification information of the destination node 204, the user, or the network to which the destination node 204 belongs) in operation 1720. For example, the controller 202 may update the data flow dependent on the control flow.

In operation 1725, the controller 202 may transmit, to the destination node 204, a response to the request for the update of the control flow. For example, the controller 202 may transmit, to the destination node 204, the identification information of the control flow and the information about the updated data flow table.

In operation 1730, the destination node 204 may process a result value depending on the received response. For example, based on state information of the updated data flow, the destination node 204 may update the data flow table stored. For another example, when receiving the information about the failure of updating the control flow, the destination node 204 may terminate the second access control application 214.

Figure 18:
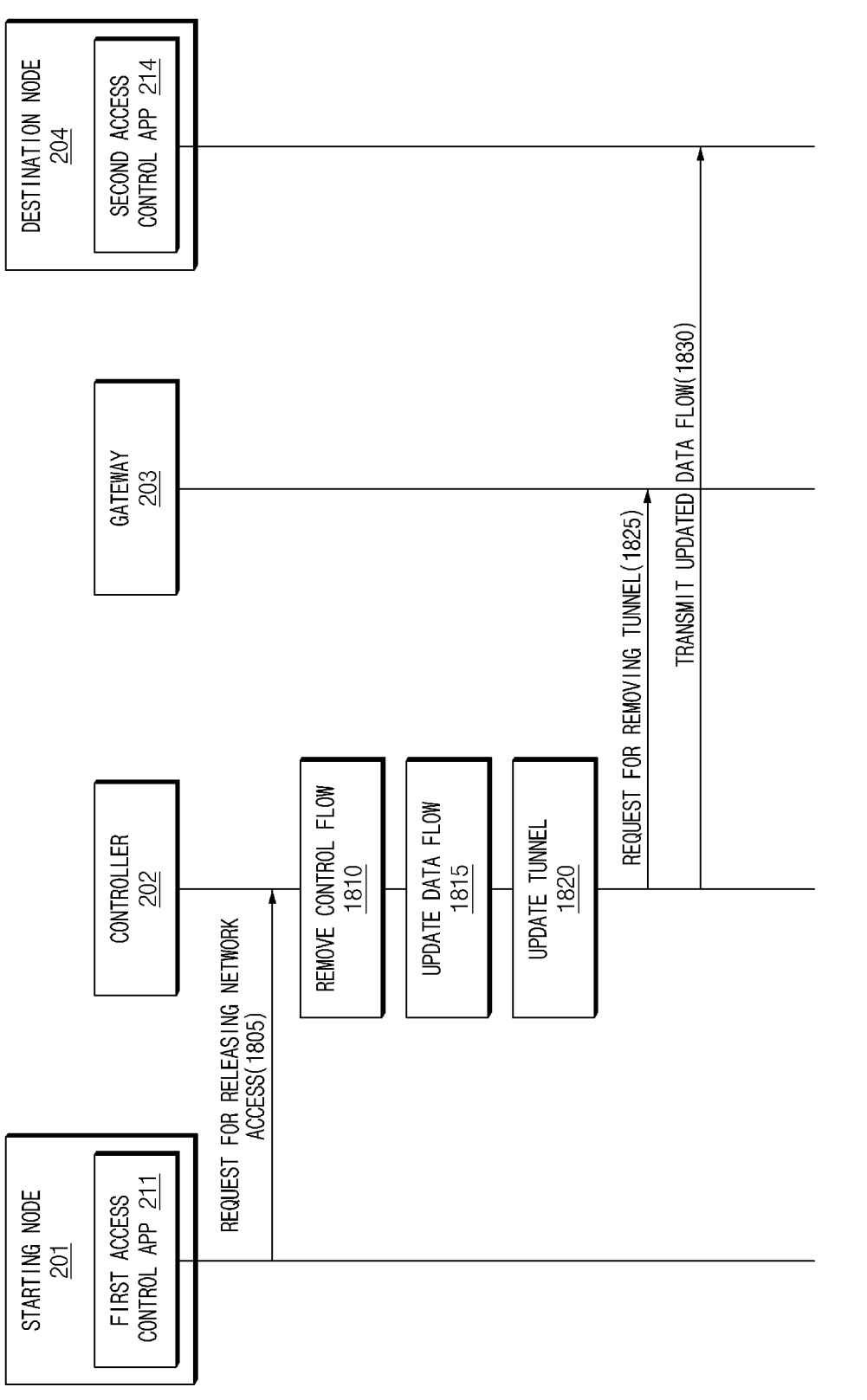
FIG. 18 is a signal flowchart for releasing network access at a starting node according to various embodiments.
Figure 20:
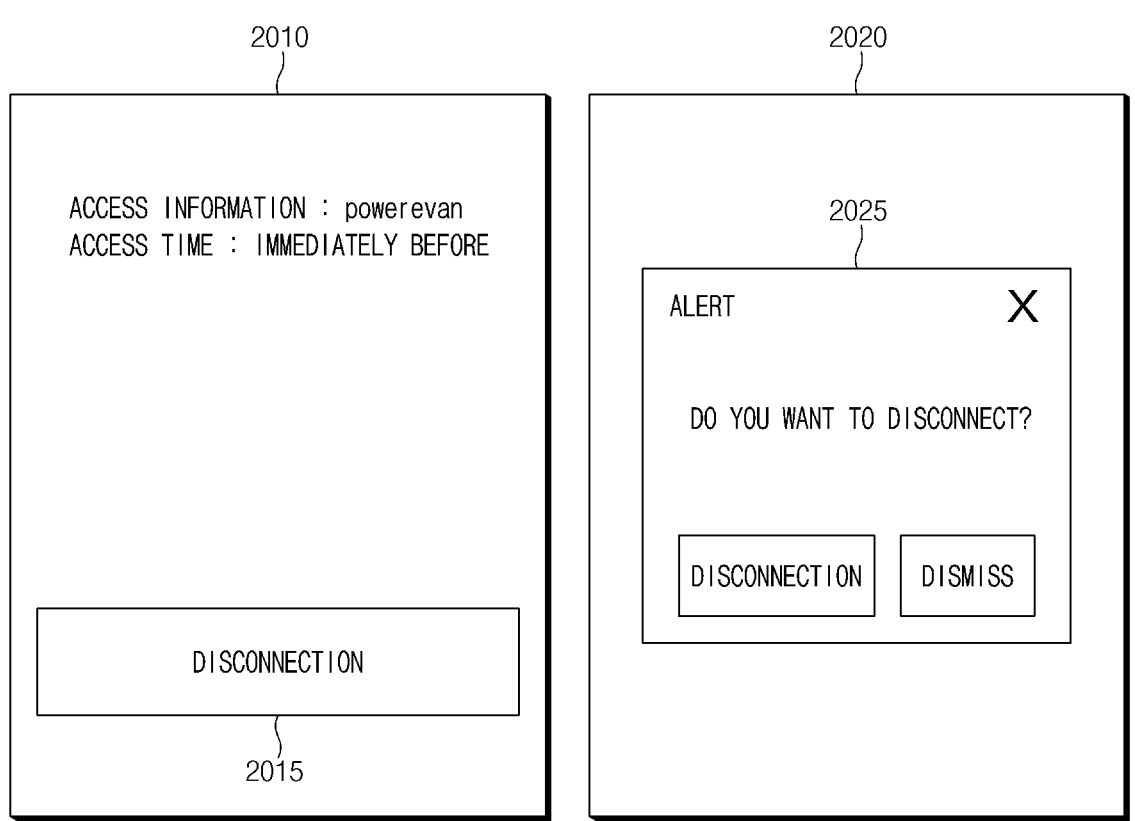
FIG. 20 illustrates a user interface screen for releasing network access.

FIGS. 18 and 20 illustrate an operation for releasing network access according to various embodiments. FIG. 18 illustrates a signal flowchart for releasing network access at a starting node according to various embodiments, and FIG. 20 illustrates a user interface screen for releasing network access.

Referring to FIG. 18, in operation 1805, the starting node 201 may transmit, to the controller 202, a request for release of the network access. For example, the starting node 201 may transmit identification information of a control flow between the starting node 201 and the controller 202 to the controller 202, together with information about the request for the release of the network access.

According to an embodiment, the starting node 201 may attempt to release the network access, in response to a network access release event, such as a request of the user, a restart of the starting node 201, or a request of the first access control application 211. For example, referring to FIG. 20, the starting node 201 may receive a user input for selecting a connection end button 2015 on a user interface screen 2010 outputted through the display. The starting node 201 may request the user to confirm the termination of the network access to the user again by outputting the user interface screen 2020 including a pop-up window 2025. For another example, the starting node 201 may immediately perform operation 1805 without outputting the user interface screen 2020.

In operation 1810, the controller 202 may remove (or release) a control flow corresponding to the received identification information, in response to the request received from the starting node 201.

In operation 1815, the controller 202 may update (or release or remove) a data flow dependent on the removed control flow. For example, a plurality of data flows dependent on the removed control flow may be provided. In this case, the controller 202 may update (or release or remove) all data flows dependent on the removed control flow.

In operation 1820, the controller 202 may update (or release or remove) a tunnel dependent on the removed control flow. For example, a plurality of tunnels dependent on the removed control flow may be provided. In this case, the controller 202 may update (or release or remove) all tunnels dependent on the removed control flow.

In operation 1825, the controller 202 may transmit, to a gateway 203, a request for removing the tunnel dependent on the removed control flow. The gateway 203 may remove the tunnel in response to the request of the controller 202.

In operation 1830, the controller 202 may transmit an updated data flow to the destination node 204. The destination node 204 may receive information about the updated data flow and update a data flow table which is stored. When the data flow is removed, a data packet transmitted to the destination network including the destination node 204 and corresponding to the removed data flow may be blocked by the second access control application 214. Through the above-described operation, a system including the destination node 204 may completely block or isolate the transmitted data packet, such that a data packet transmitted from the starting node 201 is not received any more.

Figure 19:
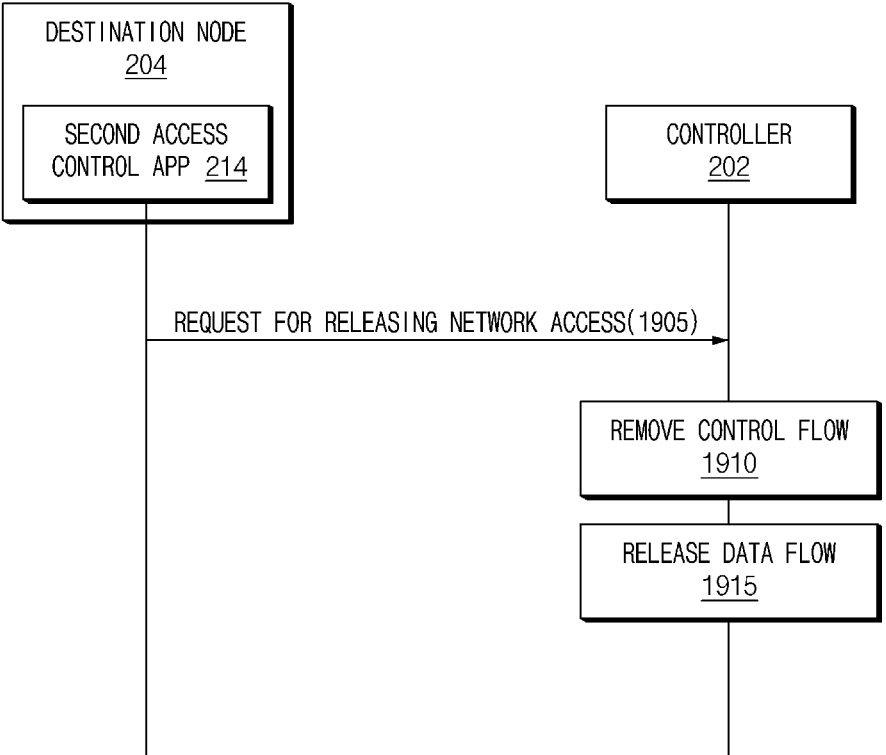
FIG. 19 is a signal flowchart for releasing network access at a destination node according to various embodiments.

FIG. 19 is a signal flowchart for releasing network access at a destination node according to various embodiments Referring to FIG. 19, in operation 1905, the destination node 204 may transmit, to the controller 202, a request for release of the network access. For example, the destination node 204 may transmit identification information of a control flow between the destination node 204 and the controller 202 to the controller 202, together with information about the request for release of the network access.

According to an embodiment, the destination node 204 may attempt to disconnect the network access, in response to a network access disconnecting event, such as a request of the user, a restart of the destination node 204, or a request of the second access control application 214. For example, referring to FIG. 20, the destination node 204 may receive a user input for selecting the connection end button 2015 on a user interface screen 2010 outputted through the display.

The destination node 204 may request the user to confirm the termination of the connection to the user again by outputting a user interface screen 2020 including a pop-up window 2025. For another example, the destination node 204 may immediately perform operation 1905 without outputting the user interface screen 2020.

In operation 1910, the controller 202 may remove (or release) the control flow corresponding to the received identification information, in response to the request received from the destination node 204.

In operation 1915, the controller 202 may release (or update or remove) a data flow dependent on the removed control flow. For example, a plurality of data flows dependent on the removed control flow may be provided. In this case, the controller 202 may release (or update or remove) all data flows dependent on the removed control flow. Accordingly, as the data flow is released, the starting node 201 may not transmit the data packet to the destination node 204.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A node comprising:
a communication circuit;
a processor operatively connected to the communication circuit; and
a memory operatively connected to the processor and configured to store a receive application and an access control application,
wherein the memory stores instructions causing the node to: when executed by the processor,
sense a network reception event from a starting network through the access control application;
identify presence of a data flow corresponding to a destination service port included in a data packet received from the starting network through the access control application and authorized by an external server; and transmit, to the external server, a request for network reception, based on whether the authorized data flow is present and whether the authorized data flow includes identification information of the starting network, through the access control application.

2. The node of claim 1, wherein the instructions cause the node to:

drop the data packet when the authorized data flow is absent;

receive the data packet, when the authorized data flow is present and includes the identification information of the starting network;

transmit, to the external server, a request for reception of a first network, when the authorized data flow is present, but fails to include the identification information of the starting network, wherein the request for the reception of the first network includes the identification information of the starting network, the destination service port or identification information of the authorized data flow;

receive a data flow updated, from the external server, wherein the updated data flow includes the identification information of the starting network; and receive the data packet, based on the updated data flow.

3. The node of claim 1, wherein the instructions cause the node to:

determine whether the authorized data flow including identification information of the receive application and the destination service port, when the receive application is identified through the data packet;

receive the data packet, when the authorized data flow is present;

transmit, to the external server, a request for reception of a second network when the authorized data flow is absent, wherein the request for the reception of the second network includes the identification information of the receive application and the destination service port; and receive a data flow including the receive application and the destination service port from the external server.

4. The node of claim 1, wherein the instructions cause the node to:

sense a network transmission event for a response to the received data packet through the access control application;

identify presence of a data flow corresponding to identification information of the node and identification information of the receive application;

transmit, to the external server, a request for network transmission through the access control application, when the data flow is absent, wherein the request for the network transmission includes identification information of the control flow, identification information of the destination network, and information about a starting service port;

receive a data flow including the receive application, the identification information of the destination network, and the starting service port, from the external server; and transmit a response data packet to the received data packet, based on the received data flow.

5. The node of claim 1, wherein the instructions cause the node to:

sense a controller access event for the external server through the access control application, and transmit, to the external server, a request for access to the controller; and receive a first response to the request for the access to the controller from the external server, and wherein the first response includes:

the identification information of the control flow, information about an application allowing reception, and information about a service port allowing reception.

6. The node of claim 5, wherein the instructions cause the node to:

determine whether the application allowing reception is present and whether the application allowing reception is executed, through the access control application, based on information about the application allowing reception;

determine whether an application, which is present and executed in the node, of the application allowing reception is performing a reception operation through the service port allowing the reception;

transmit, to the external server, information about whether the application allowing reception is present and executed, and whether the application is performing the reception operation through the service port allowing the reception; and receive a data flow generated, from the external server.

7. The node of claim 5, wherein the instructions cause the node to:

receive a user input for making a request for user authentication;

transmit, to the external server, the request for the user authentication for a user of the node through the communication circuit, wherein the request for the user authentication includes information corresponding to the user input; and receive a second response to the request for the user authentication, from the external server, wherein the second response includes identification information of the control flow, the information about the application allowing reception, and the information about the service port allowing the reception.

8. The node of claim 1, wherein the instructions cause the node to:

sense an update event of a control flow generated between the node and the external server;

transmit, to the external server, a request for update the control flow through the communication circuit, in response to the sensed event; and receive a third response to the request for the update of the control flow, from the external server, and wherein the third response includes an updated data flow.

9. The node of claim 1, wherein the instructions cause the node to:

sense an application execution event through the access control application;

determine whether the executed application is performing a network reception operation;

identify presence of a data flow, which is authorized, corresponding to identification information of the executed application and a service port for reception of the executed application, when the executed application is performing the network reception operation;

transmit, to the external server, a request for the data flow authorized, when the data flow authorized is absent; and receive a data flow generated or updated from the external
server.

10. The node of claim 1, wherein the instructions cause
the node to:

sense an application termination event through the access 5
control application;

identify presence of a data flow, which is authorized,
corresponding to identification information of the
application which is terminated;

remove a data flow, which is authorized, corresponding to 10
the identification information of the application termi-
nated, when the data flow is present; and transmit, to the external server, a request for removing the
data flow authorized.

\* \* \* \* \* 15